United States Patent
Binder et al.

(10) Patent No.: US 11,456,598 B1
(45) Date of Patent: Sep. 27, 2022

(54) TWO WIRE POWER DELIVERY SYSTEM FOR MOBILE DEVICES WITH PASSIVE ORIENTATION DETECTION

(71) Applicant: MICROSOFT TECHNOLOGY LICENSING, LLC, Redmond, WA (US)

(72) Inventors: Julian Arlo Binder, Redwood City, CA (US); Brandon Baxter Harris, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/362,930

(22) Filed: Jun. 29, 2021

(51) Int. Cl.
*H02J 1/06* (2006.01)
*G06F 1/18* (2006.01)
*H02J 7/00* (2006.01)

(52) U.S. Cl.
CPC ............... *H02J 1/06* (2013.01); *G06F 1/189* (2013.01); *H02J 7/0034* (2013.01); *H02J 2310/22* (2020.01)

(58) Field of Classification Search
CPC ...... H02J 7/0034; H02J 7/0036; H02J 7/0031; H02J 7/0029; H02J 2310/22; H02J 2310/50; H02J 1/06
See application file for complete search history.

(56) References Cited

U.S. PATENT DOCUMENTS

| | | | |
|---|---|---|---|
| 8,783,861 B2 | 7/2014 | Blum et al. | |
| 8,801,174 B2 | 8/2014 | Willey | |
| 9,640,921 B2 | 5/2017 | Choi | |
| 10,261,162 B2 | 4/2019 | Bucknor et al. | |
| 2012/0001740 A1* | 1/2012 | Doi ........................... | H02J 1/06 340/12.32 |
| 2018/0286609 A1* | 10/2018 | Chang ................... | H01H 47/002 |
| 2018/0351359 A1* | 12/2018 | Abe ........................ | G01R 31/42 |
| 2020/0014163 A1 | 1/2020 | Kwon et al. | |
| 2020/0201042 A1 | 6/2020 | Wang et al. | |

FOREIGN PATENT DOCUMENTS

CN 209046286 U 6/2019

OTHER PUBLICATIONS

Pino, Nick, "Bose Frames Combine Headphones, Sunglasses and . . . Augmented Reality?", Retrieved from: https://www.techradar.com/in/news/bose-frames-combine-headphones-sunglasses-and-augmented-reality, Retrieved on: Apr. 27, 2021, 9 Pages.

\* cited by examiner

*Primary Examiner* — Nguyen Tran
(74) *Attorney, Agent, or Firm* — Scott Y. Shigeta; Newport IP, LLC

(57) ABSTRACT

Technologies are described herein for a two-wire power delivery system that may be employed by a mobile device with a reversable cable. The described techniques allow for the two-wire power cable to be inserted in any orientation into the mobile device, without requiring a special keying or registration element, and without requiring any additional pins or wires. The mobile device includes a passive protection circuit that assists the two-wire power cable system in detecting the correct orientation for power delivery.

20 Claims, 7 Drawing Sheets

TWO WIRE POWER DELIVERY SYSTEM FOR MOBILE DEVICES WITH PASSIVE ORIENTATION DETECTION

BACKGROUND

Many developments have been made to improve the way batteries are used in mobile devices. For instance, some charging circuits have been developed to enable a single battery charger to supply power for device operation while also providing an independent power source to charge the device batteries. Although there have been some improvements with respect to such circuits, there are many shortcomings and inefficiencies with respect to current technologies. For example, some current charging circuits are quite bulky and heavy. Additionally, special connectors are often required that are keyed to ensure proper orientation of the connector when connected to the mobile device. Such designs have poor consumer appeal and would benefit from an improved design.

The disclosure made herein is presented with respect to these and other considerations. It is with respect to these and other considerations that the disclosure made herein is presented.

SUMMARY

Technologies are described herein for a two-wire power delivery system that may be employed by a mobile device with a reversable cable. The described techniques allow for the two-wire power cable to be inserted in any orientation into the mobile device, without requiring a special keying or registration element, and without requiring any additional pins or wires. The mobile device includes a passive protection circuit that assists the two-wire power cable system in detecting the correct orientation for power delivery.

It should be appreciated that the above-described subject matter may also be implemented as part of an apparatus, system, or as part of an article of manufacture. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. References made to individual items of a plurality of items can use a reference number with a letter of a sequence of letters to refer to each individual item. Generic references to the items may use the specific reference number without the sequence of letters.

DETAILED DESCRIPTION

Figure 1:
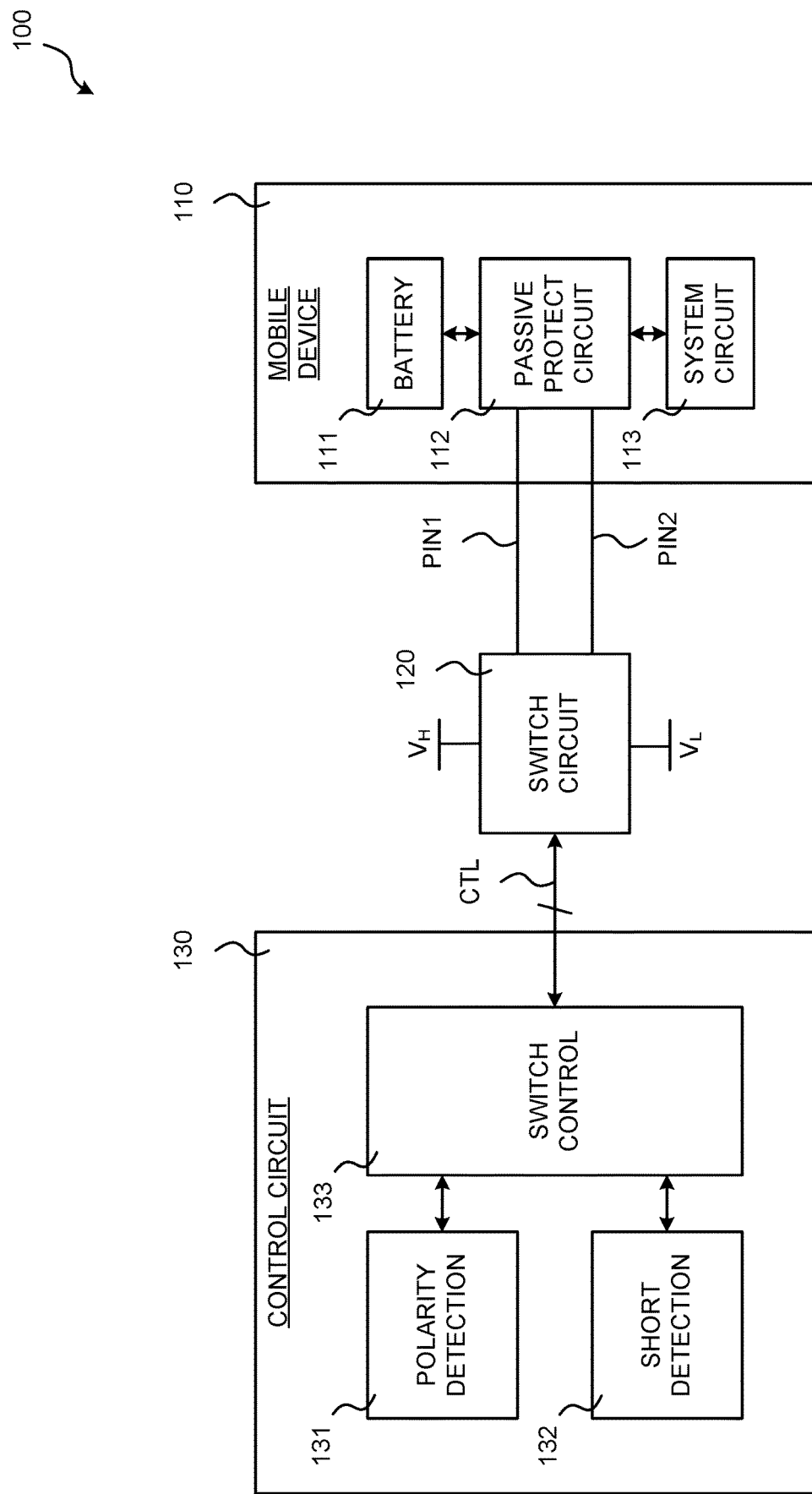
FIG. 1 shows a schematic diagram of an example power delivery system for a mobile device with passive orientation detection.

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a power, current, voltage, or data signal. The terms, "gate," "drain," and "source," can also mean a "base," "collector" and "emitter," and/or equivalent parts.

Technologies are described herein for a two-wire power delivery system that may be employed by a mobile device with a reversable cable. The described techniques allow for the two-wire power cable to be inserted in any orientation into the mobile device, without requiring a special keying or registration element, and without requiring any additional pins or wires. The mobile device includes a passive protection circuit that assists the two-wire power cable system in detecting the correct orientation for power delivery.

Mobile devices, such as cell phones, handheld gaming devices, smart watches, headphones and headsets often include rechargeable batteries. Cables and connectors for these mobile devices often may be used for many purposes, for example: to recharge the batteries, to allow device use when the battery charge is too low, and/or to transfer data into or out of the mobile device. Consequently, many mobile devices use power connector and cabling interfaces that are manufactured according to industry standards.

The Universal Serial Bus (USB) is an industry standard that establishes specifications for cables and connectors and the various protocols for connecting power and data. The USB standard has changed over time, and there now exists multiple versions of the standard (USB 1.0, USB 2.0, USB 3.0, USB 3.1, etc.). The evolution of the standard has led to increased data transmission speeds, as well as support for a variety of different connector styles.

Although there are now many different styles of connectors that are now supported in the USB standard, the connectors are still fairly large size since they support both power and data communications. Moreover, data communication cable designs tend to require certain considerations to minimize signal crosstalk and radio frequency (RF) interference, which results in special designs that may be bulky. Consequently, the design of power cables using these standardized cables and connectors may not be ideal in all applications.

Specially designed power cables can be used to power mobile devices. The design of such a power cable may require certain consideration to ensure the power cable is inserted with a correct orientation, specifically to prevent damage to the electronics and/or battery in the mobile device. A keying element may be employed to ensure proper orientation of the cable when connected to the mobile device. The mobile device may thus include a female connector that is specially designed to engage with a male cable, where the male to female connection only accepts a single orientation for proper engagement. For example, in a mini-USB style cable the keying element is found in the shape of an outer shield ring of the connector itself, where the outer ring has a trapezoidal shape (e.g., a D style connector) that can only engage in one orientation. In other examples, the mobile device may have a shaped detent that is designed to accept cable insertion when a matching protrusion on the cable aligns with the detent, and blocks cable insertion when the protrusion is in a reversed orientation or misaligned.

Some power cables can be designed to reversable, where no keying element is required to ensure proper engagement and where the cable can be accepted by the mobile device in any orientation. A power cable with a reversable design may require additional or redundant wires and pins ensure the positive and negative power connections engage properly irrespective of the cable orientation. Moreover, reversable power cables may require the power connection points to be offset or an identification pin may be required to allow the mobile device to detect the orientation of the cable. The presently disclosure contemplates these factors and other consideration in reversable cable and power connector design for portable devices.

A two-wire power delivery system is described herein that may be employed by a mobile device with a reversable cable. The described techniques allow for the power cable in a mobile device to be inserted in any orientation without requiring a special keying or registration element, and without requiring any additional pins or wires. Also, the presently described techniques allow for passive detection of orientation when the battery in the mobile device is discharged. Thus, the described two-wire power delivery system is efficient and economical, and has added features benefits that will be apparent from the below detailed description.

FIG. 1 shows a schematic diagram of an example power delivery system 100 for a mobile device with passive orientation detection. Power delivery system 100 includes a mobile device 110, a switch circuit 120, and a control circuit 130.

Mobile device 100 further includes a battery 111, a passive protection circuit 112, and a system circuit 113. Battery 111 may be any type of rechargeable battery (e.g. Lithium Ion polymer, Nickel-Metal Hydride, Etc.), that may be utilized to power various circuits in the mobile device, either through direct or indirect connections. For example, system circuit 113 of mobile device 100 may be powered by battery 111. The battery 111 my further include one or more individual batteries or cells, which may be arranged in either series or parallel configurations, which may collectively referred to as battery 111.

The passive protection circuit 112 for mobile device 100 serves multiple functions. In one example, circuit 112 prevents an incorrectly connected battery charger (e.g., one where the power and ground pins are reversed) from damaging the circuits and/or the battery in the mobile device 100. In another example, circuit 112 is specifically designed to collaboratively operate with the charger (e.g., the cable and connector that delivery power to the mobile device pins) to allow detection of the reverse polarity as will be understood by the other details found herein. The design of circuit 112 is passive, meaning that circuit 112 will continue to operate correctly even when the battery 111 is discharged (either partially or completely). Example passive protection circuits will be described with reference to FIGS. 2 and 4.

The passive protection circuit 112 of mobile device 110 is coupled to the switch circuit 120 via two power pins, a first power pin (PIN1) and a second power pin (PIN2). Switch circuit 210 is designed to selectively deliver power to the two power pins (PIN1, PIN2) of the mobile device 110 from an externally supplied power source, which may be described as a high-side supply (e.g., VH) and a low-side supply (e.g., VL). In some examples, the high-side supply may correspond to a positive supply (e.g., VH=+12+9V+6V+5V, or +3V, etc.) and a low-side supply may correspond to a ground return (e.g., VL=0V). In other examples, the low-side supply may correspond to another external supply such as a negative power supply (e.g., VL=−12V, −9V, −6V, −5V, or −3V, etc.). The examples provided herein are merely provided as general examples, and all varieties of power supplies are contemplated.

The switch circuit 120 is designed to selectively deliver power to the mobile device 110 in response to control signals (e.g., CTL), which are provided by the control circuit 130. The control signals may correspond to any required number of control signals. Thus, switch circuit 120 is designed to selectively enable and disable power to the two pins such that the orientation of the two-wire connection from the first power pin (PIN1) and the second power pin (PIN2) may be tested for proper orientation, safety, and power delivery. In some examples, additional logic may be employed inside the switch circuit 120 to reduce the number of required control signals from the control circuit. Example switch circuits are described with reference to FIGS. 3 and 5.

Control circuit 130 includes several internal functions, which can broadly be considered as polarity detection 131, short-circuit protection 132, and switch control 133. These functions may be provided by individual circuits, analog and/or digital, or combined into operation of a single circuit. In some examples, the functions of the control circuit 130 may be provided by a programmable logic device (PLD), a controller or other similar designs, which may be adapted (e.g., programmed) to perform the functions described herein. Example state machines that may be employed for at least a portion of the control circuit are described with reference to FIGS. 6 and 7.

Mobile device 110 may be any variety of portable electronic device that may benefit from a two-wire power deliver system, including but not limited to a head mounted display, a gaming device, a virtual reality headset, etc.

Figure 2:
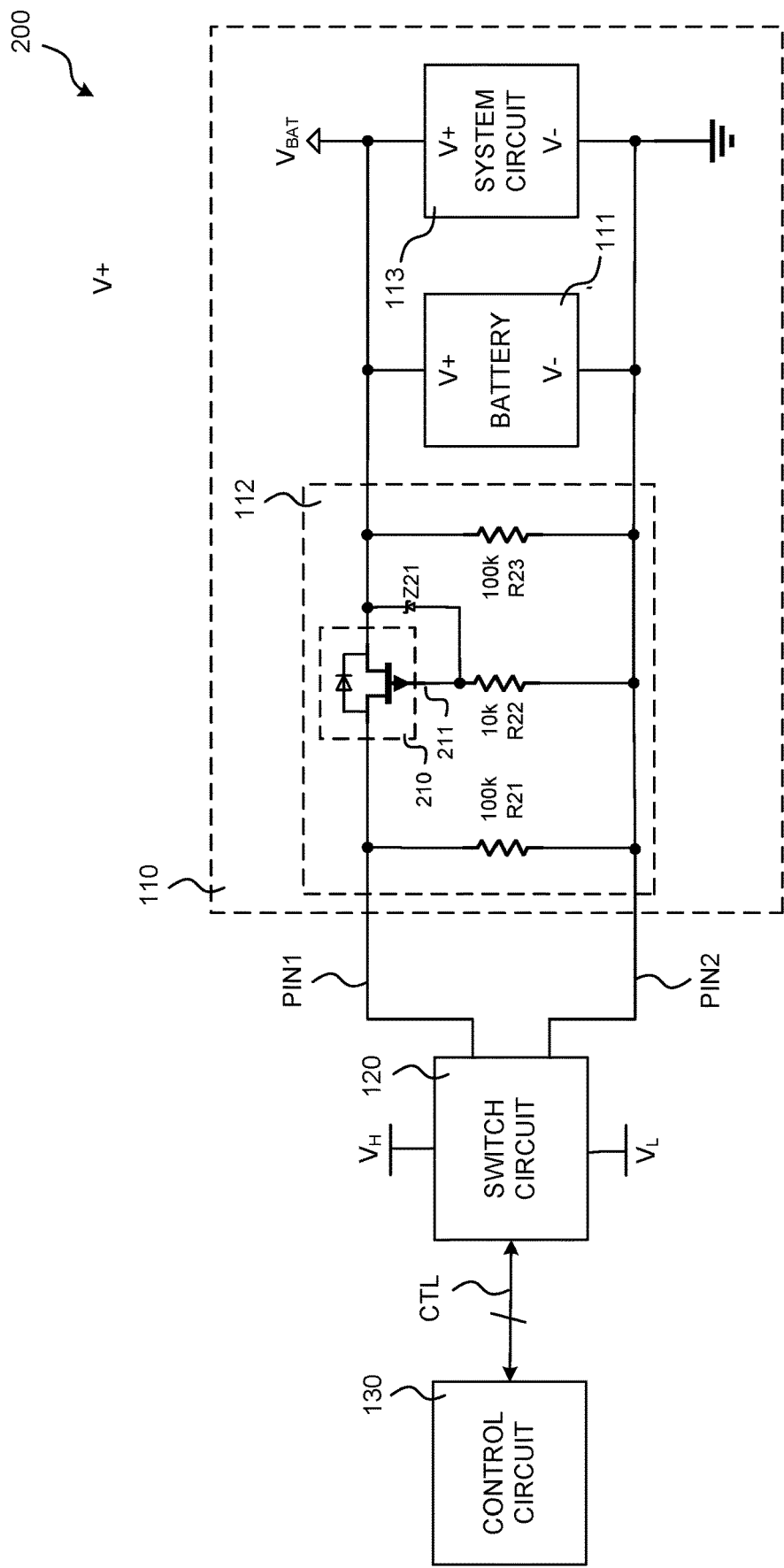
FIG. 2 shows a detailed schematic diagram of another example power delivery system for a mobile device with passive orientation detection.

FIG. 2 shows a detailed schematic diagram of another example power delivery system 200 for a mobile device with passive orientation detection. Power delivery system 200 includes a mobile device 110, a switch circuit 120, and a control circuit 130. System 200 is substantially similar to other example systems described herein, with the additional of an example mobile device 110 with a detailed example of passive protection circuit 112.

Battery 111 includes a positive terminal (V+) that corresponds to the power VBAT supply for the mobile device 110, and a negative terminal (V−) that corresponds to the ground (GND) of the mobile device 110. The system circuit 113, is illustrated as being coupled in parallel with battery 111, but additional circuitry may be utilized to provide the power to the various system circuits 113 of mobile device 110. The ground of the mobile device (GND) is also coupled to the second power pin PIN2, which serves as the ground return for any externally supplied power.

The example passive protection circuit 112 of FIG. 2 includes a first resistor R21, a second resistor R22, a third resistor R23, a transistor circuit 210, and a diode circuit Z21. The first resistor R21 is coupled between the first power pin PIN1 and the second power pin PIN2, and is shown with a value of 100 KΩ. The second resistor R22 is coupled between the second power pin PIN2 and an intermediate node 211, and is shown with a value of 10 KΩ. The third resistor R23 is coupled between the second power pin PIN2 and the positive terminal (V+) of the battery 111, and is shown with a value of 100 KΩ. Transistor circuit 210 includes first port coupled to the first power pin PIN1, a second port coupled to the positive terminal (V+) of the battery 111, and a third port coupled to the intermediate node 211. The diode circuit Z21 is coupled between the positive terminal (V+) of the battery and the intermediate node 211, which is configured to operate as a voltage clamp on the VGS voltage of the transistor circuit 210. The precise resistor values may vary, and these values are merely provided as examples.

Transistor circuit 210 includes a p-type transistor (e.g., a p-FET), which is configured to conditionally activate based on the polarity and voltage conditions applied to the first power pin PIN1 and the second power pin PIN2. A first source or drain terminal of the p-type transistor is coupled to the first power pin PIN1, while a second source or drain terminal is coupled to the positive terminal (V+) of the battery, and a gate terminal is coupled to the intermediate node 211. The transistors described herein may be any appropriate device such as a metal oxide semiconductor device (MOS), a junction field effect transistor (JFET) device, or some other field effect transistor (FET) device. The transistor circuits described herein may further include other components that may be required to ensure proper operation of the functions provided by the specific transistors.

The operation of the passive protection circuit 112 will be described with further reference to the control circuit 130 and the switch circuit 120, which collaboratively configure the first and second power pins PIN1, PIN2. As follows:

TABLE 1

| Operating Phase | PIN1 | PIN2 | CONDITION |
| --- | --- | --- | --- |
| IDLE | NC | NC | Isolate VH and VL from PIN1 and PIN2 |
| TESTA | $V_H$ | PD | Test PIN2 through Pulldown circuit |
| TESTB | PD | $V_H$ | Test PIN1 through Pulldown circuit |
| CONNECTA | $V_H$ | $V_L$ | Normal Orientation PIN1 = +, PIN2 = − |
| CONNECTB | $V_L$ | $V_H$ | Reverse Orientation PIN1 = −, PIN2 = + |

In a first operating phase: IDLE, the switch control circuit 130 configures the switch circuit 120 to operate both the first and second power pins PIN1, PIN2 in a "no connect" or "open circuit" configuration where they are both decoupled from power.

In a second operating phase: TESTA, the switch control circuit 130 configures the switch circuit 120 to couple PIN1 to the high-side supply ($V_H$) and couple PIN2 through a pulldown resistor to the low-side supply ($V_L$) or ground return (GND). This configuration is in a test condition to determine if the normal orientation is appropriate.

In a third operating phase: TESTB, the switch control circuit 130 may configure the switch circuit 120 to couple PIN1 to the high-side supply ($V_H$) and couple PIN2 through a pulldown resistor to the low-side supply ($V_L$) or ground return (GND). This configuration is in a test condition to determine if the reverse orientation is appropriate.

In a fourth operating phase: CONNECTA, the switch control circuit 130 may configure the switch circuit 120 to couple PIN1 to the high-side supply ($V_H$) and couple PIN2 to the low-side supply ($V_L$) or ground return (GND). This configuration is a normal orientation connection.

In a fifth operating phase: CONNECTB, the switch control circuit 130 may configure the switch circuit 120 to couple PIN2 to the high-side supply ($V_H$) and couple PIN1 to the low-side supply ($V_L$) or ground return (GND). This configuration is a reverse orientation connection.

In the first operating phase, IDLE, the power pins PIN1 and PIN2 are in an open circuit condition and no current will flow through the first and second resistors R21, R22 of the passive protection circuit 112. Therefore, the intermediate node 211 will have the same potential as the negative terminal (V−) of the battery 111 (e.g., GND), and the transistor circuit 201 will be inactive since there is no forward bias applied between the source and gate terminals. Since transistor circuit 201 is inactive, there is no conduction path from the positive battery terminal (V+) to PIN1, and thus the impedance of the passive protection circuit (between PIN1 and PIN2) will correspond to an open circuit (e.g., a high impedance).

In the second and fourth operating phases, TESTA and CONNECTA, PIN1 is configured as a positive power supply ($V_H$) and PIN2 is configured as a conduction path to the negative power supply ($V_H$) or ground return (GND). Assuming there are no short circuit conditions, the transistor circuit 210 is forward biased or activated, and power from the first power supply pin PIN1 will be coupled to the positive terminal (V+) of the battery 111. In this operating phase, the impedance of the passive protection circuit (between PIN1 and PIN2) will correspond to the parallel combination of resistors R21 and R23, with an effective resistance that is determined by their values (e.g., 100 KΩ/2 or 50 KΩ in this example).

In the third and fifth operating phases, TESTB and CONNECTB, PIN2 is configured as a positive power supply ($V_H$) and PIN1 is configured as a conduction path to the negative ($V_L$) or return (e.g., GND) of the power supply. Assuming no short circuit conditions, the transistor circuit 210 is reverse biased or deactivated and thus blocks conduction between PIN1 and the positive terminal (V+) of the battery 111. Since conduction is blocked, power will flow through resistor R21 but not the other resistors R22 and R23, and thus the impedance of the passive protection circuit (between PIN1 and PIN2) will correspond to the R21 (e.g., 100 KΩ in this example).

Figure 3:
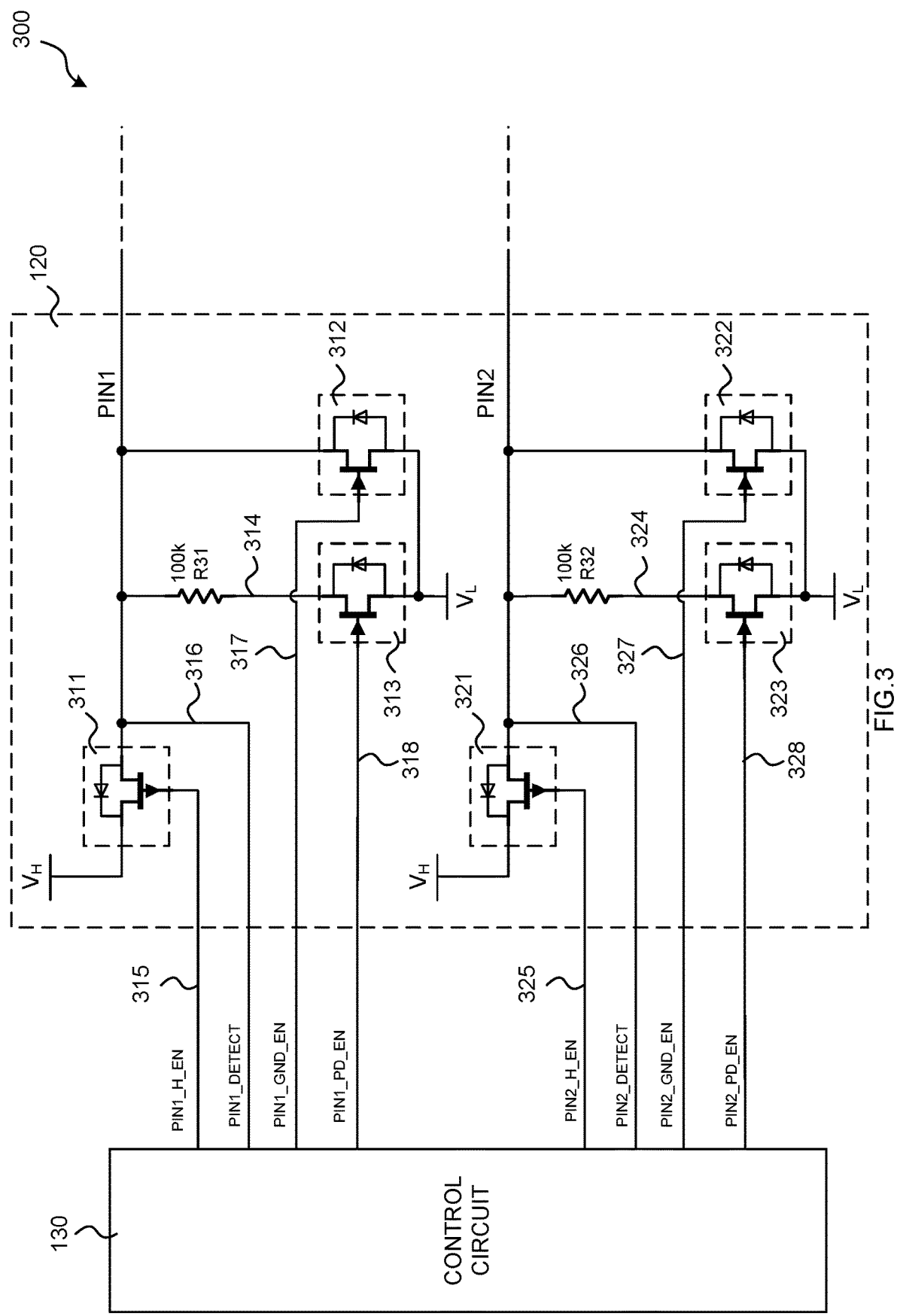
FIG. 3 shows a detailed schematic diagram of yet another example power delivery system for a mobile device with passive orientation detection.

FIG. 3 shows a detailed schematic diagram of yet another example power delivery system 300 for a mobile device with passive orientation detection. Power delivery system 300 includes a switch circuit 120, and a control circuit 130. System 300 is substantially similar to other example systems described herein, with the addition of an example switch circuit 120. The mobile device of FIG. 2 with passive circuit protection 112 is compatible with the switch circuit of FIG. 3, as will become apparent from the below discussion.

The example switch circuit 120 of FIG. 3 includes a first resistor R31, a second resistor R32, a first transistor circuit 311, a second transistor circuit 312, a third transistor circuit 313, a fourth transistor circuit 321, a fifth transistor circuit 322, and a sixth transistor circuit 323. The first resistor R31 is coupled between the first power pin PIN1 and a first intermediate node 314, and is shown with a value of 100 KΩ. The second resistor R32 is coupled between the second power pin PIN2 and a second intermediate node 324, and is shown with a value of 100 KΩ. The first transistor circuit 311 includes first port coupled to the high-side supply ($V_H$), a second port coupled to the first power pin PIN1, and a third port coupled to a PIN1 high enable control 315 (PIN1_H_EN). The second transistor circuit 312 includes first port coupled to the first power pin PIN1, a second port coupled to the low-side supply ($V_L$), and a third port coupled to a PIN1 ground enable control 317 (e.g., PIN1_GND_EN). The third transistor circuit 313 includes a first port coupled to the first intermediate node 314, a second port coupled to the low-side supply ($V_L$), and a third port coupled to a first pulldown control 318 (e.g., PIN1_PD_EN). The fourth transistor circuit 321 includes first port coupled to the high-side supply ($V_H$), a second port coupled to the second power pin PIN2, and a third port coupled to a PIN2 high enable control 325 (PIN2_H_EN). The fifth transistor circuit 322 includes a first port coupled to the second power pin PIN2, a second port coupled to the low-side supply ($V_L$), and a third port coupled to a PIN2 ground enable control 327 (e.g., PIN2_GND_EN). The sixth transistor circuit 323 includes a first port coupled to the second intermediate node 324, a second port coupled to the low-side supply ($V_L$), and a third port coupled to a second pulldown control 328 (e.g., PIN2_PD_EN). Transistor circuits 311 and 321 are illustrated as including p-type transistors, while transistor circuits 312, 313, 322, and 323 are illustrated as including n-type transistors; but other transistor arrangements are contemplated. The precise resistor values may vary, and these values are merely provided as examples.

The operation of switch circuit 120 will be described with reference to the operating phases and Table 1 previously described above for FIG. 2.

In the first operating phase, IDLE, both power pins (PIN1, PIN2) are isolated from the high-side supply (e.g., $V_H$) and the low-side supply (e.g., $V_L$). Based on this operating condition, transistor circuits 311, 312, 313, 321, 322 and 323 are all disabled so they present a high impedance. The control signals for the p-type transistors illustrated herein will all correspond to high signals (e.g., $V_H$) since the p-type transistors are activated with a low signal (e.g., $V_L$), while the control signals for the n-type transistors will all correspond to low signals (e.g., $V_L$) since the n-type transistors are activated with a high signal (e.g., $V_H$). Thus, for these transistor circuits to be fully disabled:
PIN1_H_EN=PIN2_H_EN=$V_H$
PIN1_GND_EN=PIN1_PD_EN=$V_L$
PIN2_GND_EN=PIN2_PD_EN=$V_L$ In the second operating phase, TESTA, the first power pin (PIN1) is coupled to the high-side supply (e.g., $V_H$) and the second power pin (PIN2) is coupled to the low-side supply (e.g., $V_L$) though the pulldown resistor (R32). Based on this operating condition, transistor circuits 311 and 323 are active, and the remaining transistor circuits 312, 313, 321, and 322 are disabled so they present a high impedance. Thus, for these transistor circuits to be configured properly:
PIN1_H_EN=PIN1_GND_EN=PIN1_PD_EN=$V_L$
PIN2_H_EN=PIN2_PD_EN=$V_H$
PIN2_GND_EN=$V_L$ In the third operating phase, TESTB, the second power pin (PIN2) is coupled to the high-side supply (e.g., $V_H$) and the first power pin (PIN1) is coupled to the low-side supply (e.g., $V_L$) though the pulldown resistor (R31). Based on this operating condition, transistor circuits 321 and 313 are active, and the remaining transistor circuits 311, 312, 322, and 323 are disabled so they present a high impedance. Thus, for these transistor circuits to be configured properly:
PIN1_H_EN=PIN1_PD_EN=$V_H$
PIN1_GND_EN=$V_L$
PIN2_H_EN=PIN2_GND_EN=PIN2_PD_EN=$V_L$ In the fourth operating phase, CONNECTA, the first power pin (PIN1) is coupled to the high-side supply (e.g., $V_H$) and the second power pin (PIN2) is coupled to the low-side supply (e.g., $V_L$). Based on this operating condition, transistor circuits 311 and 322 are active, and the remaining transistor circuits 312, 313, 321, and 323 are disabled so they present a high impedance. Thus, for these transistor circuits to be configured properly:
PIN1_H_EN=PIN1_GND_EN=PIN1_PD_EN=$V_L$
PIN2_H_EN=PIN2_GND_EN=$V_H$
PIN2_PD_EN=$V_L$ In the fifth operating phase, CONNECTB, the first power pin (PIN1) is coupled to the low-side supply (e.g., $V_L$) and the second power pin (PIN2) is coupled to the hide-side supply (e.g., $V_H$). Based on this operating condition, transistor circuits 312 and 321 are active, and the remaining transistor circuits 311, 313, 322, and 323 are disabled so they present a high impedance. Thus, for these transistor circuits to be configured properly:
PIN1_H_EN=PIN1_GND_EN=$V_H$
PIN1_PD_EN=$V_L$
PIN2_H_EN=PIN2_GND_EN=PIN2_PD_EN=$V_L$ First Example Evaluation of DETECT Voltages for TESTA The second operating phase is referred to as TESTA. In this operating phase the conditions are tested to verify the connection and orientation of the connection. In particular, PIN2_DETECT is evaluated to determine what voltage is present when PIN1 is coupled to $V_H$ and PIN2 is coupled to $V_L$ (or GND) via pulldown resistor R32. There are multiple possibilities to consider for TESTA: an open circuit where the passive protection circuit is disconnected, a closed circuit where the passive protection circuit is connected and in the correct orientation, a closed circuit where the passive protection circuit is connected and in the incorrect orientation (and should be reversed), or a closed circuit where the passive protection circuit is connected and under a short circuit condition.

When the cable is not connected to a mobile device, or some other open circuit condition exists, the voltage at PIN2 will collapse to GND (or $V_L$) since the pulldown resistor R32 is active on PIN2. Thus, if TESTA yields a detection voltage of GND ($V_L$), then there is no load connected, and we can proceed back to the IDLE or NC condition.

When the cable is connected and there is a short circuit between PIN1 and PIN2, then the voltage at PIN2 will correspond to a high voltage near $V_H$. Thus, if TEST A yields a detection voltage at PIN 2 of $V_H$, there is likely a short circuit. However, the other conditions must be tested to verify a short circuit.

When the cable is connected and the orientation is correct, the passive protection circuit 112 will allow conduction from PIN1 to both resistors R21 and resistor R23, which will result in a combined resistance of R21 and R23 in parallel between PIN1 and PIN2. Given they are of equal values (in some examples), their overall combined resistance is given by R21/2. Combining the resistance of R21/2 and R32 from the pulldown resistor yields a detection voltage of DETECT≈$(V_H-V_L)$*R32/(R32+R21/2). Assuming R32 has the same resistance value of R21, and $V_L$=0V, the detection voltage at PIN2 will correspond to approximately ⅔ of the supply voltage (e.g., DETECT≈2*$V_H$/3 when $V_L$=0V).

When the cable is connected but the orientation is incorrect, the passive protection circuit 112 will block conduction between PIN1 and resistor R23, and the only conduction path provided from PIN1 to PIN2 will be via R21. Combining the resistance of R21 and R32 from the pulldown resistor yields a detection voltage of DETECT≈$(V_H-V_L)$*R32/(R32+R21). Assuming R21 and R32 have the same resistance values, and $V_L$=0V, the voltage at PIN2 will correspond to approximately half of the supply voltage (e.g., DETECT≈$V_H$/2 when $V_L$=0V).

First Example Evaluation of DETECT Voltages for TESTB

The third operating phase is referred to as TESTB. In this operating phase the conditions are tested to verify the orientation of the connection is reversed. In particular, PIN1_DETECT is evaluated to determine what voltage is present when PIN2 is coupled to $V_H$ and PIN1 is coupled to $V_L$ (or GND) via pulldown resistor R31. There are multiple possibilities to consider for TESTB: an open circuit where the passive protection circuit is disconnected, a closed circuit where the passive protection circuit is connected and in the correct orientation, a closed circuit where the passive protection circuit is connected and in the incorrect orientation, or a closed circuit where the passive protection circuit is connected and under a short circuit condition. The analysis for TEST B is substantially similar to TEST A.

When the cable is connected and the reverse orientation is correct, the passive protection circuit 112 will allow conduction from PIN2 to both resistors R21 and resistor R23, which will result the combined resistance of R21 and R23 in parallel between PIN1 and PIN2. Given they are of equal values, their overall resistance is given by R21/2. Combining the resistance of R21/2 and R32 from the pulldown resistor yields a detection voltage of DETECT≈$(V_H-V_L)$*R31/(R31+R21/2). Assuming R31 has the same resistance value of R21, and $V_L$=0V, the detection voltage at PIN2 will correspond to approximately ⅔ of the supply voltage (e.g., DETECT≈2*$V_H$/3 when $V_L$=0V).

When the cable is connected but the orientation is incorrect, the passive protection circuit 112 will block conduction between PIN1 and resistor R23, and the only conduction path provided from PIN1 to PIN2 will be via R21. Combining the resistance of R21 and R31 from the pulldown resistor yields a detection voltage of DETECT≈$(V_H-V_L)$*R31/(R31+R21). Assuming R21 and R31 have the same resistance values, and $V_L$=0V, the voltage at PIN2 will correspond to approximately half of the supply voltage (e.g., DETECT≈$V_H$/2 when $V_L$=0V).

Transistor circuits 311 and 321 each are illustrated to include a p-type transistor (e.g., a p-FET); while transistor circuits 312, 313, 322 and 323 each are illustrated to include a n-type transistor (e.g., an n-FET); where each transistor circuit is configured to conditionally activate based on the polarity and voltage conditions applied at their respective source and gate terminals. For each transistor circuit, a first source or drain terminal of the p-type transistor is coupled to the first port in the respective transistor circuit, while the second source or drain terminal is coupled to the second port, and the gate terminal is coupled to the third port. For example, a first source or drain terminal of the p-type transistor in the transistor circuit 311 may be coupled to the high-side supply ($V_H$), while a second source or drain terminal is coupled to the first power pin PIN1, and a gate terminal may be coupled to the control signal at node 315. The control signals for the p-type transistor circuits are active on a low signal ($V_L$), while the control signals for the n-type transistor circuits are active on a high signal ($V_H$). However, the logic level for activation of the various circuits could be changed by simple logic inverters if needed.

The transistors described herein may be any appropriate device such as a metal oxide semiconductor device (MOS), a junction field effect transistor (JFET) device, or some other field effect transistor (FET) device. The transistor circuits described herein may further include other components that may be required to ensure proper operation of the functions provided by the specific transistor circuits. Additionally, although described as p-type transistors and n-type transistors, other combinations of n-type and p-type transistors may be adapted for use in the present system.

Figure 4:
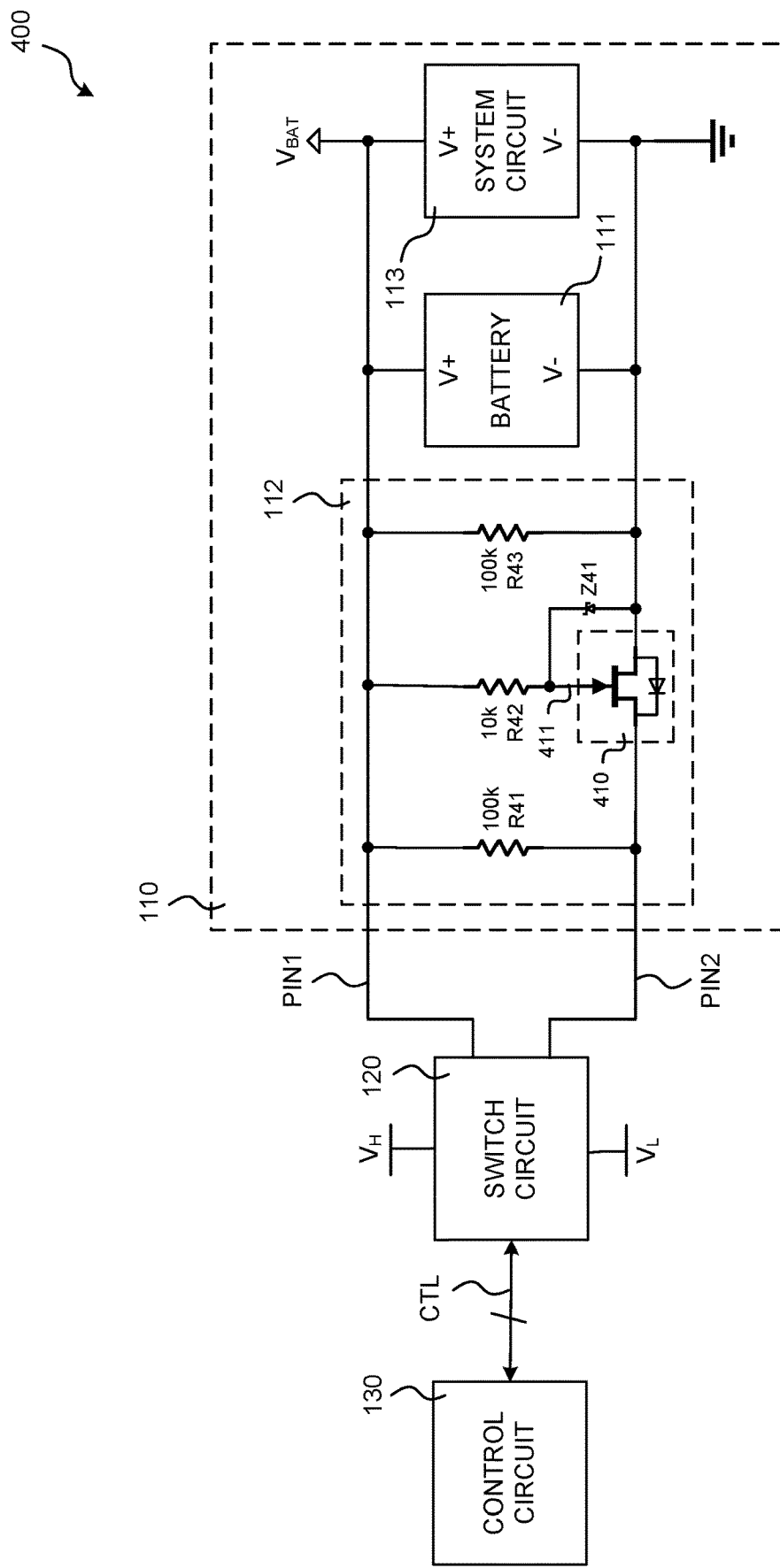
FIG. 4 shows a detailed schematic diagram of still another example power delivery system for a mobile device with passive orientation detection.

FIG. 4 shows a detailed schematic diagram of still another example power delivery system 400 for a mobile device with passive orientation detection. Power delivery system 200 includes a mobile device 110, a switch circuit 120, and a control circuit 130. System 200 is substantially similar to other example systems described herein, with the additional of an example mobile device 110 with a detailed example of passive protection circuit 112. The passive protection circuit of FIG. 4 is similar to that shown in FIG. 2, but where the signals are blocked using n-type transistor circuits instead of p-type.

Battery 111 again includes a positive terminal (V+) that corresponds to the power VBAT supply for the mobile device 110, and a negative terminal (V−) that corresponds to the ground (GND) of the mobile device 110; with the system circuit 113 illustrated as being coupled in parallel with battery 111. However, the ground of the mobile device (GND) is not coupled directly to the second power pin PIN2 as was described for FIG. 2. Instead, the positive battery terminal (V+) of the mobile device (VBAT) is coupled to the first power pin PIN1, and the ground of the mobile device is isolated from the second power pin PIN2 as will be described below.

The example passive protection circuit 112 of FIG. 4 includes a first resistor R41, a second resistor R42, a third resistor R43, a transistor circuit 410, and a diode circuit Z41. The first resistor R41 is coupled between the first power pin PIN1 and the second power pin PIN2, and is shown with a value of 100 KΩ. The second resistor R42 is coupled between the first power pin PIN1 and an intermediate node 411, and is shown with a value of 10 KΩ. The third resistor R43 is coupled between the first power pin PIN1 and the negative terminal (V−) of the battery 111, and is shown with a value of 100 KΩ. Transistor circuit 410 includes first port coupled to the first power pin PIN1, a second port coupled to the positive terminal (V+) of the battery 111, and a third port coupled to the intermediate node 411. The diode circuit Z41 is coupled between the positive terminal (V+) of the battery and the intermediate node 411, which is configured to operate as a voltage clamp on the VGS voltage of the transistor circuit 410. The precise resistor values may vary, and these values are merely provided as examples.

Transistor circuit 410 includes an n-type transistor (e.g., a n-FET), which is configured to conditionally activate based on the polarity and voltage conditions applied to the first power pin PIN1 and the second power pin PIN2. A first source or drain terminal of the n-type transistor is coupled to the second power pin PIN2, while a second source or drain terminal is coupled to the negative terminal (V−) of the battery, and a gate terminal is coupled to the intermediate node 411.

The transistors described herein may be any appropriate device such as a metal oxide semiconductor device (MOS), a junction field effect transistor (JFET) device, or some other field effect transistor (FET) device. The transistor circuits described herein may further include other components that may be required to ensure proper operation of the functions provided by the specific transistors.

The operation of the passive protection circuit 112 in FIG. 4 will again be described with further reference to the control circuit 130 and the switch circuit 120, which collaboratively configure the first and second power pins PIN1, PIN2. As follows:

TABLE 2

| Operating Phase | PIN1 | PIN2 | CONDITION |
| --- | --- | --- | --- |
| IDLE | NC | NC | Isolate VH and VL from PIN1 and PIN2 |
| TESTA | PU | $V_L$ | Test PIN1 through Pullup circuit |
| TESTB | $V_L$ | PU | Test PIN2 through Pullup circuit |
| CONNECTA | $V_H$ | $V_L$ | Normal Orientation PIN1 = +, PIN2 = − |
| CONNECTB | $V_L$ | $V_H$ | Reverse Orientation PIN1 = −, PIN2 = + |

Table 2 is similar to Table 1 described previously, except that the detection is for the TESTA and TESTB conditions are implemented with a pullup circuit instead of a pulldown circuit.

In the first operating phase: IDLE, the switch control circuit 130 configures the switch circuit 120 to operate both the first and second power pins PIN1, PIN2 in a "no connect" or "open circuit" configuration where they are both decoupled from power.

In a second operating phase: TEST1, the switch control circuit 130 configures the switch circuit 120 to couple PIN2 to the low-side supply ($V_L$) and couple PIN1 through a pullup resistor to the high-side supply ($V_H$). This configuration is in a test condition to determine if the normal orientation is appropriate.

In a third operating phase: TEST2, the switch control circuit 130 may configure the switch circuit 120 to couple PIN1 to the low-side supply ($V_L$) and couple PIN2 through a pullup resistor to the high-side supply ($V_H$). This configuration is in a test condition to determine if the reverse orientation is appropriate.

In a fourth operating phase: CONNECT1, the switch control circuit 130 may configure the switch circuit 120 to couple PIN1 to the high-side supply ($V_H$) and couple PIN2 to the low-side supply ($V_L$) or ground return (GND). This configuration is a normal orientation connection.

In a fifth operating phase: CONNECT2, the switch control circuit 130 may configure the switch circuit 120 to couple PIN2 to the high-side supply ($V_H$) and couple PIN1 to the low-side supply ($V_L$) or ground return (GND). This configuration is a reverse orientation connection.

In the first operating phase, IDLE, the power pins PIN1 and PIN2 are in an open circuit condition and no current will flow through the first and second resistors R41, R42 of the passive protection circuit 112. Therefore, the intermediate node 411 will have the same potential as the positive terminal (V+) of the battery 111 (e.g., $V_{BAT}$), and the transistor circuit 401 will be inactive since there is no forward bias applied between the source and gate terminals. Since transistor circuit 401 is inactive, there is no conduction path from the negative battery terminal (V−) to PIN2, and thus the impedance of the passive protection circuit (between PIN1 and PIN2) will correspond to an open circuit (e.g., a high impedance).

In the second and fourth operating phases, TEST1 and CONNECT1, PIN2 is configured as a negative power supply ($V_L$) and PIN1 is configured as a conduction path to the positive power supply ($V_H$). Assuming there are no short circuit conditions, the transistor circuit 410 is forward biased or activated, and power from the second power supply pin PIN2 will be coupled to the negative terminal (V−) of the battery 111. In this operating phase, the impedance of the passive protection circuit (between PIN1 and PIN2) will correspond to the parallel combination of resistors R41 and R43, with an effective resistance that is determined by their values (e.g., 100 KΩ/2 or 50 KΩ in this example).

In the third and fifth operating phases, TEST2 and CONNECT 2, PIN1 is configured as a negative power supply ($V_L$) and PIN2 is configured as a conduction path to the positive ($V_H$) power supply. Assuming no short circuit conditions, the transistor circuit 410 is reverse biased or deactivated and thus blocks conduction between PIN2 and the negative terminal (V−) of the battery 111. Since conduction is blocked, power will flow through resistor R41 but not the other resistors R42 and R43, and thus the impedance of the passive protection circuit (between PIN1 and PIN2) will correspond to R41 (e.g., 100 KΩ in this example).

Figure 5:
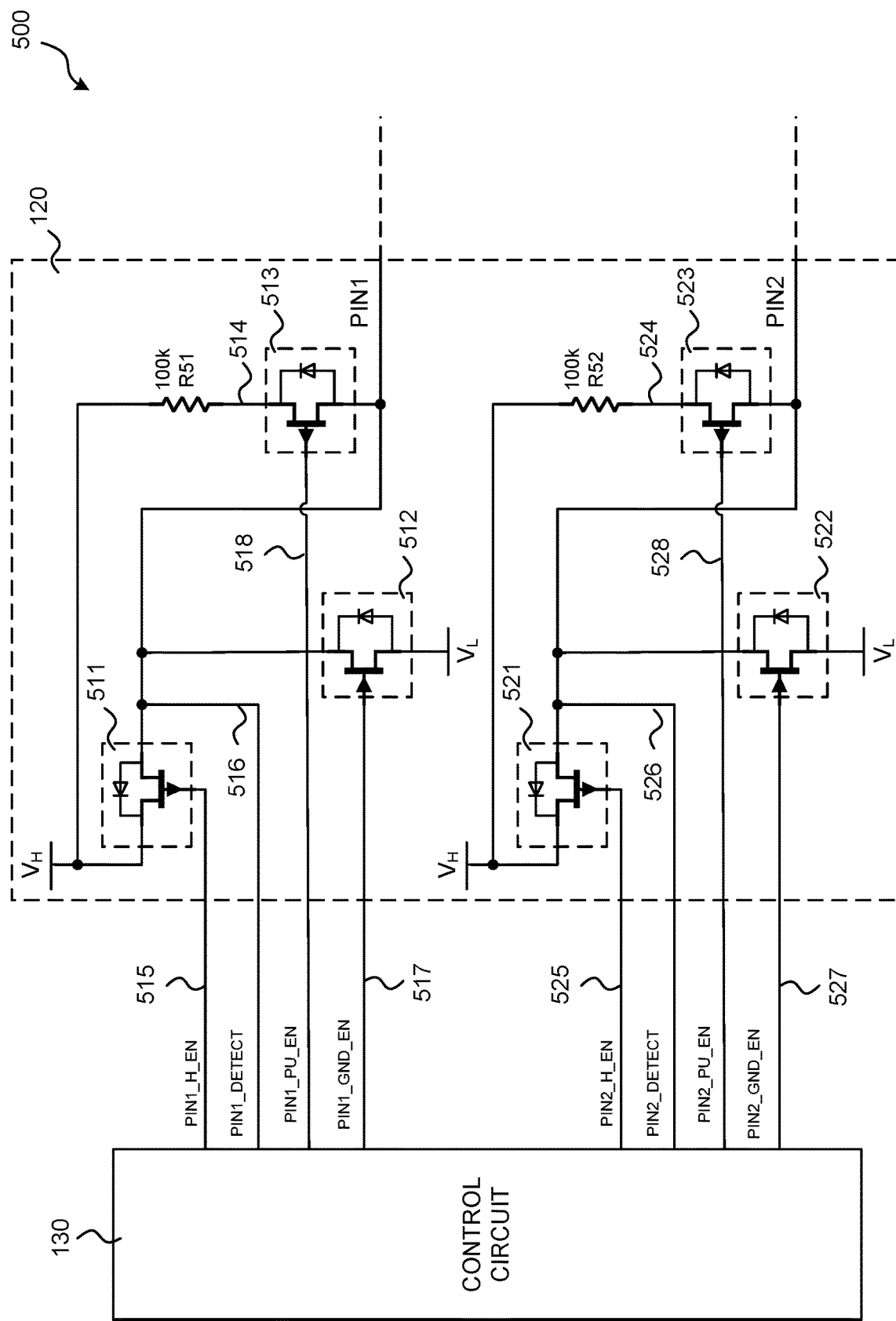
FIG. 5 shows a detailed schematic diagram of yet still another example power delivery system for a mobile device with passive orientation detection.

FIG. 5 shows a detailed schematic diagram of yet still another example power delivery system 500 for a mobile device with passive orientation detection. Power delivery system 500 includes a switch circuit 120, and a control circuit 130. System 500 is substantially similar to other example systems described herein, with the addition of an example switch circuit 120. The mobile device of FIG. 4 with passive circuit protection 112 is compatible with the switch circuit of FIG. 5, as will become apparent from the below discussion.

The example switch circuit 120 of FIG. 5 includes a first resistor R51, a second resistor R52, a first transistor circuit 511, a second transistor circuit 512, a third transistor circuit 513, a fourth transistor circuit 521, a fifth transistor circuit 522, and a sixth transistor circuit 523. The first resistor R51 is coupled between the high-side supply ($V_H$) and a first intermediate node 514, and is shown with a value of 100 KΩ. The second resistor R52 is coupled between the high-side supply ($V_H$) and a second intermediate node 524, and is shown with a value of 100 KΩ. The first transistor circuit 511 includes first port coupled to the high-side supply ($V_H$), a second port coupled to the first power pin PIN1, and a third port coupled to a PIN1 high enable control 515

(PIN1_H_EN). The second transistor circuit 512 includes first port coupled to the first power pin PIN1, a second port coupled to the low-side supply ($V_L$), and a third port coupled to a PIN ground enable control 517 (e.g., PIN1_GND_EN). The third transistor circuit 513 includes a first port coupled to the first intermediate node 514, a second port coupled to the first power pin (PIN1), and a third port coupled to a first pullup control 518 (e.g., PIN1_PU_EN). The fourth transistor circuit 521 includes first port coupled to the high-side supply ($V_H$), a second port coupled to the second power pin PIN2, and a third port coupled to a PIN2 high enable control 525 (PIN2_H_EN). The fifth transistor circuit 522 includes first port coupled to the second power pin PIN2, a second port coupled to the low-side supply ($V_L$), and a third port coupled to a PIN2 ground enable control 527 (e.g., PIN2_GND_EN). The sixth transistor circuit 523 includes a first port coupled to the second intermediate node 524, a second port coupled to the second power pin (PIN2), and a third port coupled to a second pullup control 528 (e.g., PIN2_PU_EN). Transistor circuits 511, 513, 521, and 524 are illustrated as including p-type transistors, while transistor circuits 512 and 522 are illustrated as including n-type transistors; but other transistor arrangements are contemplated. The precise resistor values may vary, and these values are merely provided as examples.

The operation of switch circuit 120 will be described with reference to the operating phases and Table 2 previously described above for FIG. 4.

In the first operating phase, IDLE, both power pins (PIN1, PIN2) are isolated from the high-side supply (e.g., $V_H$) and the low-side supply (e.g., $V_L$). Based on this operating condition, transistor circuits 511, 512, 513, 521, 522 and 523 are all disabled so they present a high impedance. The control signals for the p-type transistors illustrated herein will all correspond to high signals (e.g., $V_H$) since the p-type transistors are activated with a low signal (e.g., $V_L$), while the control signals for the n-type transistors will all correspond to low signals (e.g., $V_L$) since the n-type transistors are activated with a high signal (e.g., $V_H$). Thus, for these transistor circuits to be fully disabled:
    PIN1_H_EN=PIN1_PU_EN=$V_H$
    PIN1_GND_EN=PIN2_GND_EN=$V_L$
    PIN1_PU_EN=PIN2_PU_EN=$V_H$ In the second operating phase, TESTA, the first power pin (PIN1) is coupled to the high-side supply (e.g., $V_H$) through the pullup resistor R51, and the second power pin (PIN2) is coupled to the low-side supply (e.g., $V_L$). Based on this operating condition, transistor circuits 513 and 522 are active, and the remaining transistor circuits 511, 512, 521, and 523 are disabled so they present a high impedance. Thus, for these transistor circuits to be configured properly:
    PIN1_H_EN=$V_H$
    PIN1_GND_EN=PIN1_PU_EN=$V_L$
    PIN2_H_EN=PIN2_PU_EN=$V_H$
    PIN2_GND_EN=$V_H$ In the third operating phase, TESTB, the second power pin (PIN2) is coupled to the high-side supply (e.g., $V_H$) through the pullup resistor (R52)) and the first power pin (PIN1) is coupled to the low-side supply (e.g., $V_L$). Based on this operating condition, transistor circuits 512 and 523 are active, and the remaining transistor circuits 511, 513, 521, and 522 are disabled so they present a high impedance. Thus, for these transistor circuits to be configured properly:
    PIN1_H_EN=PIN1_GND_EN=PIN1_PU_EN=$V_H$
    PIN2_H_EN=$V_H$
    PIN2_GND_EN=PIN2_PU_EN=$V_L$ In the fourth operating phase, CONNECTA, the first power pin (PIN1) is coupled to the high-side supply (e.g., $V_H$) and the second power pin (PIN2) is coupled to the low-side supply (e.g., $V_L$). Based on this operating condition, transistor circuits 511 and 522 are active, and the remaining transistor circuits 512, 513, 521, and 523 are disabled so they present a high impedance. Thus, for these transistor circuits to be configured properly:
    PIN1_H_EN=PIN1_GND_EN=$V_L$
    PIN1_PU_EN=PIN2_H_EN=PIN2_PU_EN=$V_H$
    PIN2_GND_EN=$V_L$ In the fifth operating phase, CONNECTB, the first power pin (PIN1) is coupled to the low-side supply (e.g., $V_L$) and the second power pin (PIN2) is coupled to the hide-side supply (e.g., $V_H$). Based on this operating condition, transistor circuits 521 and 512 are active, and the remaining transistor circuits 511, 513, 522, and 523 are disabled so they present a high impedance. Thus, for these transistor circuits to be configured properly:
    PIN1_H_EN=PIN1_GND_EN=PIN1_PU_EN=$V_H$
    PIN2_H_EN=PIN2_GND_EN=$V_L$
    PIN2_PU_EN=$V_H$ Second Example Evaluation of DETECT Voltages for TESTA The second operating phase is referred to as TESTA. In this operating phase the conditions are tested to verify the connection and orientation of the connection. In particular, PIN1_DETECT is evaluated to determine what voltage is present when PIN1 when PIN2 is coupled to $V_L$ (or GND) and PIN1 is coupled to $V_H$ via pullup resistor R51. There are multiple possibilities to consider for TESTA: an open circuit where the passive protection circuit is disconnected, a closed circuit where the passive protection circuit is connected and in the correct orientation, a closed circuit where the passive protection circuit is connected and in the incorrect orientation (and should be reversed), or a closed circuit where the passive protection circuit is connected and under a short circuit condition.

When the cable is not connected to a mobile device, or some other open circuit condition exists, the voltage at PIN1 will be drawn up to the high-side supply since the pullup resistor R51 is active on PIN1. Thus, if TESTA yields a detection voltage of $V_H$, then there is no load connected, and we can proceed back to the IDLE or NC condition.

When the cable is connected and there is a short circuit between PIN1 and PIN2, then the voltage at PIN1 will correspond to a low voltage near $V_L$. Thus, if TEST A yields a detection voltage at PIN 1 of $V_L$, there is likely a short circuit. However, the other conditions must be tested to verify a short circuit.

When the cable is connected and the orientation is correct, the passive protection circuit 112 will allow conduction from PIN2 to both resistors R41 and resistor R43, which will result in a combined resistance of R41 and R43 in parallel between PIN1 and PIN2. Given they are of equal values (in some examples), their overall combined resistance is given by R41/2 or 1.5*R41. Combining the resistance of 1.5*R41 and R51 from the pullup resistor yields a detection voltage of DETECT≈$(V_H-V_L)$*1.5*R41/(R51+1.5*R41). Assuming R41 has the same resistance value of R51, and $V_L$=0V, the detection voltage at PIN1 will correspond to approximately ⅓ of the supply voltage (e.g., DETECT≈$V_H$/3 when $V_L$=0V).

When the cable is connected but the orientation is incorrect, the passive protection circuit 112 will block conduction between PIN2 and resistor R43, and the only conduction path provided from PIN1 to PIN2 will be via R41. Combining the resistance of R41 and R51 from the pullup resistor yields a detection voltage of DETECT≈($V_H$−$V_L$)*R41/(R41+R51). Assuming R41 and R51 have the same resistance values, and $V_L$=0V, the voltage at PIN1 will correspond to approximately half of the supply voltage (e.g., DETECT≈$V_H$/2 when $V_L$=0V).

Second Example Evaluation of DETECT Voltages for TESTB

The third operating phase is referred to as TESTB. In this operating phase the conditions are tested to verify the orientation of the connection is reversed. In particular, PIN2_DETECT is evaluated to determine what voltage is present on PIN2 when PIN1 is coupled to $V_L$ (or GND) and PIN2 is coupled to $V_H$ via pullup resistor R52. There are multiple possibilities to consider for TESTB: an open circuit where the passive protection circuit is disconnected, a closed circuit where the passive protection circuit is connected and in the correct orientation, a closed circuit where the passive protection circuit is connected and in the incorrect orientation, or a closed circuit where the passive protection circuit is connected and under a short circuit condition. The analysis for TEST B is substantially similar to TEST A.

When the cable is connected and the reverse orientation is correct, the passive protection circuit 112 will allow conduction from PIN2 to both resistors R41 and resistor R43, which will result the combined resistance of R41 and R43 in parallel between PIN1 and PIN2. Given they are of equal values, their overall resistance is given by R41/2 or 1.5*R41. Combining the resistance of 1.5*R41 and R52 from the pullup resistor yields a detection voltage of DETECT≈($V_H$−$V_L$)*1.5*R41/(R52+1.5*R41). Assuming R41 has the same resistance value of R52, and $V_L$=0V, the detection voltage at PIN2 will correspond to approximately ⅓ of the supply voltage (e.g., DETECT≈$V_H$/3 when $V_L$=0V).

When the cable is connected but the orientation is incorrect, the passive protection circuit 112 will block conduction between PIN2 and resistor R43, and the only conduction path provided from PIN1 to PIN2 will be via R21. Combining the resistance of R21 and R31 from the pullup resistor yields a detection voltage of DETECT≈($V_H$−$V_L$)*R41/(R41+R51). Assuming R41 and R51 have the same resistance values, and $V_L$=0V, the voltage at PIN2 will correspond to approximately half of the supply voltage (e.g., DETECT≈$V_H$/2 when $V_L$=0V).

Transistor circuits 511, 513, 521 and 523 each are illustrated to include a p-type transistor (e.g., a p-FET); while transistor circuits 512 and 522 each are illustrated to include a n-type transistor (e.g., an n-FET); where each transistor circuit is configured to conditionally activate based on the polarity and voltage conditions applied at their respective source and gate terminals. For each transistor circuit, a first source or drain terminal of the p-type transistor is coupled to the first port in the respective transistor circuit, while the second source or drain terminal is coupled to the second port, and the gate terminal is coupled to the third port. The control signals for the p-type transistor circuits are active on a low signal ($V_L$), while the control signals for the n-type transistor circuits are active on a high signal ($V_H$). However, the logic level for activation of the various circuits could be changed by simple logic inverters if needed.

The transistors described herein may be any appropriate device such as a metal oxide semiconductor device (MOS), a junction field effect transistor (JFET) device, or some other field effect transistor (FET) device. The transistor circuits described herein may further include other components that may be required to ensure proper operation of the functions provided by the specific transistor circuits. Additionally, although described as p-type transistors and n-type transistors, other combinations of n-type and p-type transistors may be adapted for use in the present system.

Figure 6:
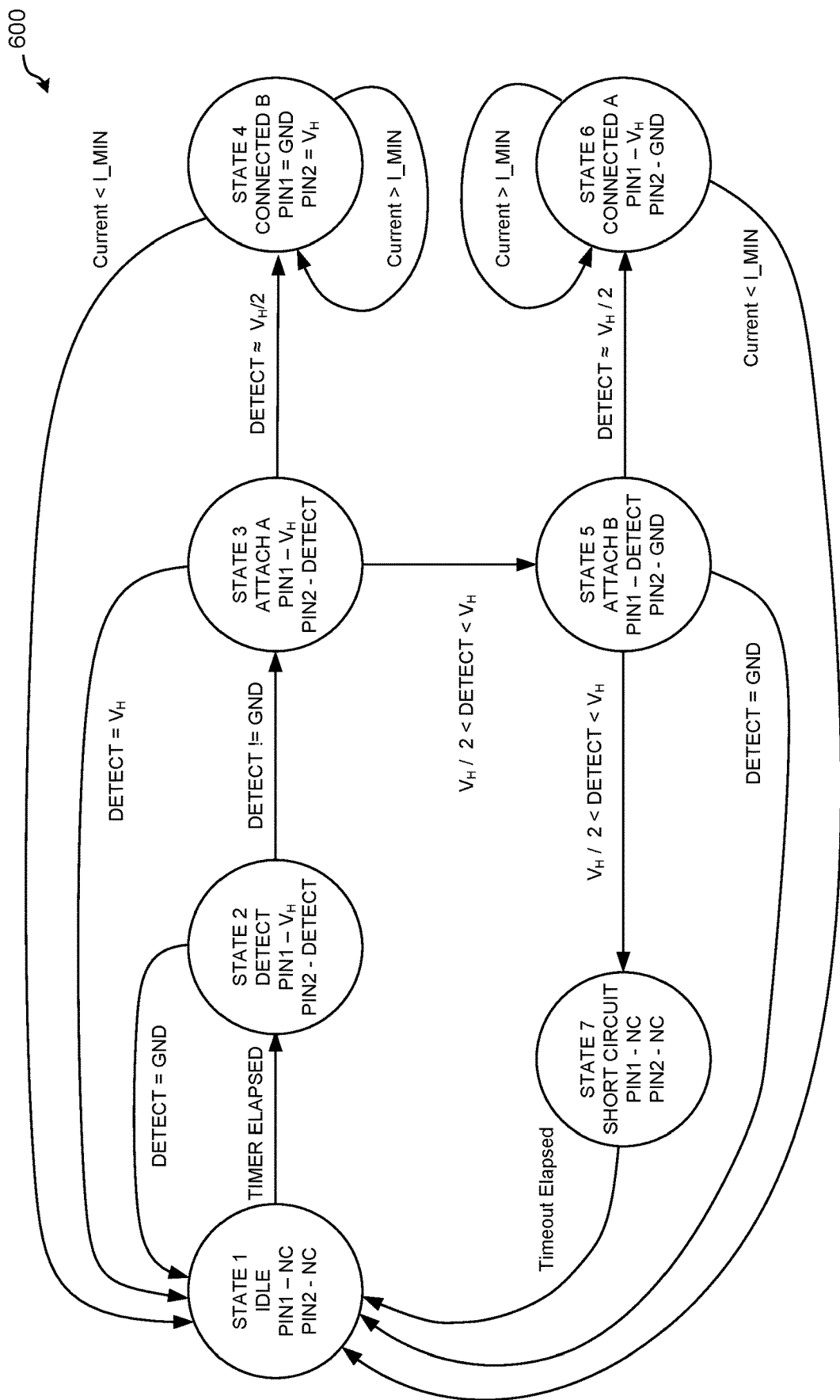
FIG. 6 shows a detailed state diagram for a control circuit for an example s power delivery system for a mobile device with passive orientation detection.

FIG. 6 shows a detailed state diagram 600 for a control circuit for an example power delivery system for a mobile device with passive orientation detection. State diagram 600 is suitable for use with the control circuit of FIG. 3 as will become apparent from the discussion below.

Processing for the control circuit begins in a first state (STATE 1), which corresponds to an IDLE state. In the IDLE state, PIN1 and PIN2 are set in a "no connect" or "open circuit" condition as previously described. A timer is employed in the IDLE state. Once the timer expires (i.e., TIMER ELAPSED) the control circuit transitions from the first state (STATE 1) to a second state (STATE2).

The second state (STATE 2) corresponds to a DETECT state. In the DETECT state, PIN1 is coupled to the high-side supply (e.g., $V_H$) and PIN2 is configured to test the orientation of the power connector for a normal orientation. For example, transistor circuits 311 and 323 of switch circuit 120 may be activated by the controller circuit 130 in STATE 2, where activation of the pulldown resistor R32 via transistor circuit 323 will allow testing of the voltage at PIN2_DETECT. When voltage is detected at GND (e.g., "DETECT=GND" or "DETECT=$V_L$"), this indicates that the cable is not connected or that there is an open circuit since there is no conduction path from PIN1 to PIN2. When voltage is detected above ground ("DETECT !=GND" or "DETECT !=$V_L$"), this indicates that there is a conduction path between PIN 1 and PIN2. STATE 2 transitions back to STATE 1, the IDLE state, when "DETECT=$V_L$". STATE 2 transitions to STATE 3 when "DETECT !=$V_L$".

The third state (STATE 3) corresponds to an ATTACH A state. In the ATTACH A state, PIN1 is coupled to the high-side supply (e.g., $V_H$) and the PIN2_DETECT voltage is evaluated to be either at the high-supply voltage ("DETECT=$V_H$"), at about half the supply voltage ("DETECT≈$V_H$/2"), or between the half supply voltage and the high supply voltage ("$V_H$/2<DETECT<$V_H$"). The control circuit transitions from the third state to a first state when the PIN2_DETECT yields "DETECT=$V_H$". The control circuit transitions from the third state to a fourth state when the PIN2_DETECT yields "DETECT $V_H$/2". The control circuit transitions from the third state to a fifth state when the PIN2_DETECT yields "$V_H$/2<DETECT<$V_H$".

The fourth state (STATE 4) corresponds to CONNECTED B, wherein PIN1 is coupled to $V_L$ and PIN2 is coupled to $V_L$. The control circuit will maintain the switch circuit in this state as long as the operating current is above a minimum threshold (Current>$I_{MIN}$). When the detected current drops below the minimum threshold (Current<$I_{MIN}$), the fourth state transitions back to the first state (IDLE).

The fifth state (STATE 5) corresponds to ATTACHB, wherein PIN2 is coupled to the low-side supply $V_L$, and the PIN1_DETECT voltage is evaluated. The fifth state is a reverse of the third state. If the PIN1_DETECT yields a voltage between the half supply voltage and the high supply voltage ("$V_H$/2<DETECT<$V_H$") in this state then a short is detected since the voltage was unchanged with a reversal of pins between STATE 3 and STATE 5; and the fifth state will transition to a seventh state. If the PIN1_DETECT corresponds to a voltage at about the half supply voltage in the fifth state ("DETECT≈$V_H$/2") in this state, then a reversal is required and the fifth state transitions to the sixth state. Lastly, if the detected voltage drops to GROUND (or $V_L$) in state 5, then this indicates an IDLE condition and the control circuit transitions to the first state.

The sixth state (STATE 6) corresponds to CONNECTED A, wherein PIN2 is coupled to $V_L$ and PIN1 is coupled to $V_L$. The control circuit will maintain the switch circuit in this state as long as the operating current is above a minimum threshold (Current>$I_{MIN}$). When the detected current drops below the minimum threshold (Current<$I_{MIN}$), the sixth state transitions back to the first state (IDLE).

The seventh state (STATE 7) corresponds to SHORT CIRCUIT, wherein PIN2 and PIN are disconnected from power (PIN1=NC, PIN2=NC) and a timeout counter starts. The timeout will prevent reconnection to power for a minimum amount of elapsed time to prevent damage. After the timeout counter expires, the seventh state transitions back to the first state (IDLE).

Figure 7:
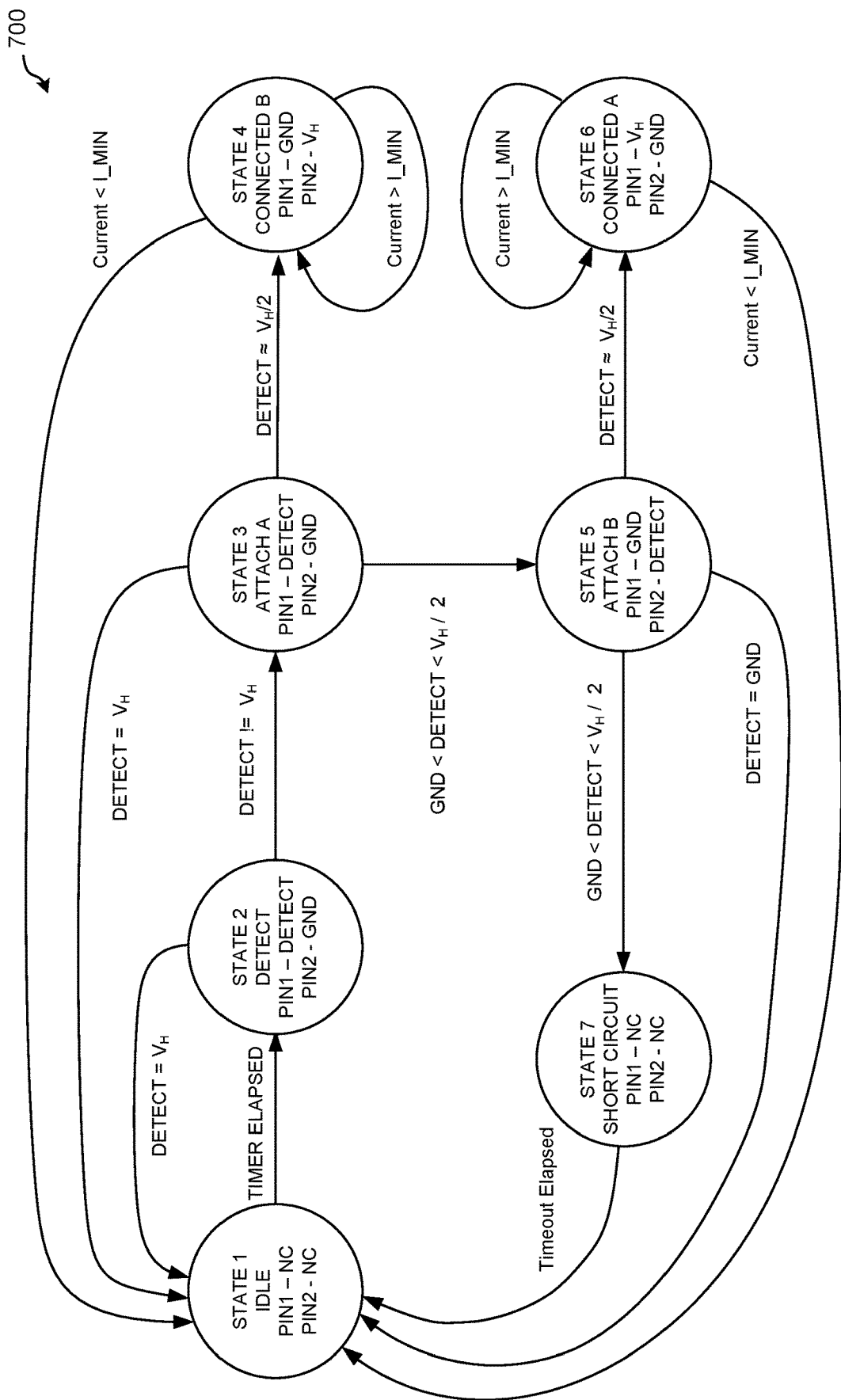
FIG. 7 shows a detailed state diagram for another control circuit for an example power delivery system for a mobile device with passive orientation detection.

FIG. 7 shows a detailed state diagram 700 for another control circuit for an example power delivery system for a mobile device with passive orientation detection. State diagram 700 is suitable for use with the control circuit of FIG. 5 as will become apparent from the discussion below.

Processing for the control circuit begins in a first state (STATE 1), which corresponds to an IDLE state. In the IDLE state, PIN1 and PIN2 are set in a "no connect" or "open circuit" condition as previously described. A timer is employed in the IDLE state. Once the timer expires (i.e., TIMER ELAPSED) the control circuit transitions from the first state (STATE 1) to a second state (STATE2).

The second state (STATE 2) corresponds to a DETECT state. In the DETECT state, PIN2 is coupled to the low-side supply (e.g., $V_L$ or GND in this example) and PIN1 is configured to test the orientation of the power connector for a normal orientation. For example, transistor circuits 522 and 513 of switch circuit 120 may be activated by the controller circuit 130 in STATE 2, where activation of the pullup resistor R51 via transistor circuit 513 will allow testing of the voltage at PIN1_DETECT. When voltage is detected at the high-side supply (e.g., "DETECT=$V_H$"), this indicates that the cable is not connected or that there is an open circuit since there is no conduction path from PIN1 to PIN2. When voltage is detected below the high-side supply ("DETECT !=$V_H$"), this indicates that there is a conduction path between PIN 1 and PIN2. STATE 2 transitions back to STATE 1, the IDLE state, when "DETECT=$V_H$". STATE 2 transitions to STATE 3 when "DETECT !=$V_H$".

The third state (STATE 3) corresponds to an ATTACH A state. In the ATTACH A state, PIN2 is coupled to the low-side supply (e.g., $V_L$ or GND in this example) and the PIN1_DETECT voltage is evaluated to be either at the high-supply voltage ("DETECT=$V_H$"), at about half the supply voltage ("DETECT≈$V_H$/2"), or between the half supply voltage and the low supply voltage or GND ("GND<DETECT<$V_H$/2"). The control circuit transitions from the third state to the first state (IDLE) when the PI12_DETECT yields "DETECT=$V_H$". The control circuit transitions from the third state to a fourth state when the PIN1_DETECT yields "DETECT≈$V_H$/2". The control circuit transitions from the third state to a fifth state when the PIN1_DETECT yields "GND<DETECT<$V_H$/2".

The fourth state (STATE 4) corresponds to CONNECTED B, wherein PIN1 is coupled to $V_L$ (or GND in this example) and PIN2 is coupled to $V_H$. The control circuit will maintain the switch circuit in this state as long as the operating current is above a minimum threshold (Current>$I_{MIN}$). When the detected current drops below the minimum threshold (Current<$I_{MIN}$), the fourth state transitions back to the first state (IDLE).

The fifth state (STATE 5) corresponds to ATTACHB, wherein PIN1 is coupled to the low-side supply ($V_L$ or GND in this example), and the PIN2_DETECT voltage is evaluated. The fifth state is a reverse of the third state. If the PIN2_DETECT yields a voltage between the high-side supply voltage and the low-side supply or GND ("GND<DETECT<$V_H$/2") in this state, then a short circuit is detected since the voltage was unchanged with a reversal of pins between STATE 3 and STATE 5; and the fifth state will transition to a seventh state. If the PIN2_DETECT corresponds to a voltage at about the half supply voltage in the fifth state ("DETECT≈$V_H$/2"), then a reversal of the power connection is required and the fifth state transitions to the sixth state. Lastly, if the detected voltage drops to GND (or $V_L$ in another example) in state 5, then this indicates an IDLE condition and the control circuit transitions to the first state.

The sixth state (STATE 6) corresponds to CONNECTED A, wherein PIN2 is coupled to $V_L$ (or GND in this example) and PIN1 is coupled to $V_H$. The control circuit will maintain the switch circuit in this state as long as the operating current is above a minimum threshold (Current>$I_{MIN}$). When the detected current drops below the minimum threshold (Current<$I_{MIN}$), the sixth state transitions back to the first state (IDLE).

The seventh state (STATE 7) corresponds to SHORT CIRCUIT, wherein PIN2 and PIN1 are disconnected from power (PIN1=NC, PIN2=NC) and a timeout counter starts. The timeout will prevent reconnection to power for a minimum amount of elapsed time to prevent damage. After the timeout counter expires, the seventh state transitions back to the first state (IDLE).

The above specification, examples and data provide a complete description of the manufacture and use of the composition of the invention. Since many embodiments of the invention can be made without departing from the spirit and scope of the invention, the invention resides in the claims hereinafter appended.

The example clauses are to supplement the present disclosure.

Clause A: A two-wire power delivery system comprising: a passive protection circuit (112) in a mobile device (110) with a two-wire power interface that includes two power pins (PIN1, PIN2); a control circuit (130), external from the mobile device (110), wherein the control circuit is powered by a high-side power supply ($V_H$) and a low-side power supply ($V_L$), and wherein the control circuit is configured to detect a voltage at a detect pin and generate one or more control signals (CTL); and a switch circuit (120), external from the mobile device (110), that is configured to selectively control connections between the two power pins (PIN1, PIN2) of the mobile device (110) and one or more of the high-side power supply (VH), the low-side power supply (VL), and the voltage detect pin of the control circuit (130), such that: in an IDLE state, the switch circuit (120) is configured to decouple the two power pins (PIN2, PIN2) from external power; in a TEST state, one of the two power pins (PIN1, PIN2) of the mobile device (110) is coupled to one of the high-side power supply and the low-side power supply by the switch circuit (120), and the other of the two power (PIN1, PIN2) is coupled through a series resistor to the other of the high-side power supply and the low-side power supply which corresponds to the detect pin of the control circuit, wherein the control circuit (130) determines an orientation of the two power pins based on a detected voltage at the detect pin; and in a CONNECT state, one of the two power pins is coupled to one of the high-side power supply and the low-side power supply by the switch circuit, and the other of the two power pins is coupled to the other of the high-side power supply and the low-side power supply by the switch circuit based on the determined orientation.

Clause B: A two-wire power delivery system comprising: a passive protection circuit (112), in a mobile device (110), with a two-wire power interface that includes two power pins (PIN1, PIN2); a switch circuit (120), external from the mobile device (110), that is configured by one or more control signals (CTL) to selectively couple the two power pins (PIN1, PIN2) to one or more of a high-side power supply (VH), a low-side power supply (VL), and a voltage detect pin, wherein the high-side power supply (VH) and the low-side power supply (VL) correspond to external power for the mobile device (110); and a control circuit (130), external from the mobile device (110), wherein the control circuit is configured to monitor a voltage at the detect pin and generate the one or more control signals (CTL) for the switch circuit such that: in a first state, the two power pins (PIN2, PIN2) are decoupled from the external power; in a second state, one of the two power pins (PIN1, PIN2) is coupled through a series resistor to the detect pin and the external power; and in a third state, the two power pins (PIN1, PIN2) are coupled to the external power with a polarity determined in the second state.

Clause C: The system of any of the example causes, wherein the passive protection circuit comprises: a first resistor coupled between the two power pins; a second resistor coupled between one of the two power pins and a battery terminal of the mobile device; a transistor circuit that is includes a first port coupled to a first one of the two power pins, a second port coupled to the battery terminal of the mobile device, and a third port coupled to the other of the two power pins; and wherein the transistor circuit is configured to: selectively couple the first port to the second port when the transistor is activated, and wherein the transistor circuit is configured to decouple the first port from the second port when deactivated.

Clause D: The system of any of the example causes, wherein the transistor circuit comprises one or more of a p-type transistor and an n-type transistor.

Clause E: The system of any of the example causes wherein the transistor circuit is configured to vary a resistance between the two terminals between a first value and a second value, wherein that resistance corresponds to the first value when the transistor circuit is deactivated, and wherein the resistance corresponds to the second value when the transistor circuit is activated, wherein the first value is greater than the second value.

Clause F: The system of any of the example causes, wherein the first resistor and the second resistor are matched such that the first value is approximately twice the value of the second value.

Clause G: The system of any of the example causes, wherein the series resistor corresponds to one of a pull-up resistor and a pull-down resistor.

Clause H: The system of any of the example causes, wherein the switch circuit comprises: a first transistor circuit that includes a first port coupled to the high-side supply (VH), a second port coupled to a first of the two power pins (PIN1), and a third port coupled to a first of the control signals (CTL) and configured to selectively couple the high side supply (VH) to the first of the two power pins (PIN1) responsive to the first of the control signals (CTL); a second transistor circuit that includes a first port coupled to the first power pin (PIN1), a second port coupled to the low-side supply (VL), and a third port coupled to a second of the control signals (CTL) and configured to selectively couple the low-side supply (VL) to the first of the two power pins (PIN1) responsive to the second of the control signals (CTL); and a third transistor circuit that includes a first port coupled to a first intermediate node, a second port coupled to one of the low-side supply (VL) and the high-side supply (VH), and a third port coupled to a third of the control signals (CTL) and configured to selectively couple the series resistor to the one of the low-side supply (VL) and the high-side supply (VH) responsive to the third of the control signals.

Clause I: The system of any of the example causes, wherein the switch circuit comprises: a fourth transistor circuit that includes a first port coupled to the high-side supply (VH), a second port coupled to a second of the two power pins (PIN2), and a third port coupled to a fourth of the control signals (CTL) and configured to selectively couple the high side supply (VH) to the second of the two power pins (PIN2) responsive to the fourth of the control signals (CTL) a fifth transistor circuit that includes a first port coupled to the first power pin (PIN1), a second port coupled to the low-side supply (VL), and a third port coupled to a fifth of the control signals (CTL) and configured to selectively couple the low-side supply (VL) to the second of the two power pins (PIN2) responsive to the fifth of the control signals (CTL); and a sixth transistor circuit that includes a first port coupled to a second intermediate node, a second port coupled to one of the low-side supply (VL) and the high-side supply (VH), and a third port coupled to a sixth of the control signals (CTL) and configured to selectively couple another series resistor to the one of the low-side supply (VL) and the high-side supply (VH) responsive to the sixth of the control signals.

Clause J: A two-wire power delivery system comprising: a passive protection circuit (112) in a mobile device (110) with a two-wire power interface that includes a first power pin (PIN1) and a second power (PIN2), wherein the passive protection circuit (112) is configured to couple the first power pin (PIN1) to the positive battery terminal (V+) when a voltage applied across the first power pin (PIN1) and the second power (PIN2) has a positive polarity, and configured to decouple the first power pin (PIN1) from the positive battery terminal (V+) when the voltage applied across the first power pin (PIN1) and the second power (PIN2) has a negative polarity; a control circuit (130), external from the mobile device (110), wherein the control circuit is powered by a high-side power supply (VH) and a low-side power supply (VL), and wherein the control circuit is selectively configured to detect a voltage at one of the first power pin (PIN1) and the second power pin (PIN2), and wherein the control circuit is configured to generate control signals (CTL) based on an operating phase of the system; and a switch circuit (120), external from the mobile device (110), that is configured by the control signals (CTL) to: responsive to a first of the control signals, couple the high-side power supply (VH) to the first power pin (PIN1); responsive to a second of the control signals, couple the low-side power supply (VL) to the first power pin (PIN1); responsive to a third of the control signals, couple the low-side power supply (VL) to the first power pin (PIN1) via a first pulldown resistor; responsive to a fourth of the control signals, couple the high-side power supply (VH) to the second power pin (PIN2); responsive to a fifth of the control signals, couple the low-side power supply (VL) to the second power pin (PIN2); and responsive to a sixth of the control signals, couple the low-side power supply (VL) to the second power pin (PIN2) via a second pulldown resistor.

Clause K: The system of any of the example causes, wherein the passive protection circuit comprises: a first resistor coupled between the first power pin (PIN1) and the second power pin (PIN2); a second resistor coupled between the positive battery terminal (V+) of the mobile device and the second power pin (PIN2); a transistor circuit that includes a first port coupled to a the first power pin (PIN1), a second port coupled to the positive battery terminal (V+) of the mobile device, and a third port coupled to the second power pin (PIN2); and wherein the transistor circuit is configured to: selectively couple the first port to the second port when the transistor is activated, and wherein the transistor circuit is configured to decouple the first port from the second port when deactivated.

Clause L: The system of any of the example causes, wherein the transistor circuit is configured to vary a resistance between the first and second power pins (PIN1, PIN2) between a first value and a second value, wherein that resistance corresponds to the first value when the transistor circuit is deactivated, and wherein the resistance corresponds to the second value when the transistor circuit is activated, wherein the first value is greater than the second value.

Clause M: The system of any of the example causes, wherein each of the first resistor, the second resistor, the first pulldown resistor, and the second pulldown resistor are matched in resistance value.

Clause N: The system of any of the example causes, wherein the control circuit is configured as a state machine that selects the control signals to actuate the switch circuit, the state machine comprising: a first state (IDLE) wherein the first power pin (PIM) and the second power pin are in an open circuit configuration; a second state (DETECT) wherein first power pin (PIN1) is coupled to the high-side supply (VH), the second power pin (PIN2) is coupled to the low-side supply (VL) via the second pulldown resistor, wherein the control circuit monitors a voltage of the second power pin (PIN2); a third state (ATTACHA) wherein the first power pin (PIN1) is coupled to the high-side supply (VH), the second power pin (PIN2) is coupled to the low-side supply (VL) via the second pulldown resistor, wherein the control circuit monitors the voltage of the second power pin (PIN2); a fourth state (CONNECT B) wherein the first power pin (PIM) is coupled to the low-side supply (VL) and the second power pin (PIN2) is coupled to the high-side supply (VH), and wherein the control circuit monitors a current consumption of the mobile device; a fifth state (ATTACHB) wherein second power pin (PIN2) is coupled to the low-side supply (VL), the first power pin (PIN1) is coupled to the high-side supply (VH) via the first pulldown resistor, and wherein the control circuit monitors a voltage of the first power pin (PIM); a sixth operating state (CONNECT A) wherein the first power pin (PIN1) is coupled to the high-side supply (VH), the second power pin (PIN2) is coupled to the low-side supply (VL), and wherein the control circuit monitors the current consumption of the mobile device; and a seventh operating state (SHORT) wherein the first power pin (PIN1) and the second power pin (PIN2) are disconnected from power.

Clause O: The system of any of the example causes, wherein the state machine of the control circuit is further configured to: transition from the first state to the second state after a timeout expires; transition from the second state to the first state when the monitored voltage of the second power pin (PIN2) corresponds to the low-side supply voltage (VL); transition from the second state to the third state when the monitored voltage of the second power pin (PIN2) is different from the low-side supply voltage (VL); transition from the third state to the first state when the monitored voltage of the second power pin (PIN2) is the high-side supply voltage (VH); transition from the third state to the fourth state when the monitored voltage of the second power pin (PIN2) is about half of the high-side supply voltage (VH/2); transition from the third state to the fifth state when the monitored voltage of the second power pin (PIN2) is in a range between about half of the high supply voltage (VH/2) and the high-side supply voltage (VH); transition from the fourth state to the first state when the monitored current consumption is below a minimum threshold (IMIN); transition from the fifth state to the first state when the monitored voltage of the first power pin (PIN1) is the low-side supply voltage (VL); transition from the fifth state to the sixth state when the monitored voltage of the first power pin (PIN1) is about half of the high-side supply voltage (VH/2); transition from the fifth state to the seventh state when the monitored voltage of the first power pin (PIN1) is in a range between about half of the high supply voltage (VH/2) and the high-side supply voltage (VH); transition from the sixth state to the first state when the monitored current consumption is below the minimum threshold (IMIN); and transition from the seventh state to the first state after another timeout expires.

Clause P: A two-wire power delivery system comprising: a passive protection circuit (112) in a mobile device (110) with a two-wire power interface that includes a first power pin (PIN1) and a second power (PIN2), wherein the passive protection circuit (112) is configured to couple the second power pin (PIN2) to the negative battery terminal (V−) when a voltage applied across the first power pin (PIN1) and the second power (PIN2) has a positive polarity, and configured to decouple the second power pin (PIN2) from the negative battery terminal (V−) when the voltage applied across the first power pin (PIN1) and the second power (PIN2) has a negative polarity a control circuit (130), external from the mobile device (110), wherein the control circuit is powered by a high-side power supply (VH) and a low-side power supply (VL), and wherein the control circuit is selectively configured to detect a voltage at one of the first power pin (PIN1) and the second power pin (PIN2), and wherein the control circuit is configured to generate control signals (CTL) based on an operating phase of the system; and a switch circuit (120), external from the mobile device (110), that is configured by the control signals (CTL) to: responsive to a first of the control signals, couple the high-side power supply (VH) to the first power pin (PIN1); responsive to a second of the control signals, couple the low-side power supply (VL) to the first power pin (PIN1); responsive to a third of the control signals, couple the high-side power supply (VH) to the first power pin (PIN1) via a first pullup resistor; responsive to a fourth of the control signals, couple the high-side power supply (VH) to the second power pin (PIN2);

responsive to a fifth of the control signals, couple the low-side power supply (VL) to the second power pin (PIN2); and responsive to a sixth of the control signals, couple the high-side power supply (VH) to the second power pin (PIN2) via a second pullup resistor.

Clause Q: The system of any of the example causes, wherein the passive protection circuit comprises: a first resistor coupled between the first power pin (PIN1) and the second power pin (PIN2); a second resistor coupled between the negative battery terminal (V−) of the mobile device and the first power pin (PIN1); a transistor circuit that includes a first port coupled to a the second power pin (PIN2), a second port coupled to the negative battery terminal (V−) of the mobile device, and a third port coupled to the first power pin (PIN1); and wherein the transistor circuit is configured to: selectively couple the first port to the second port when the transistor is activated, and wherein the transistor circuit is configured to decouple the first port from the second port when deactivated.

Clause R: The system of any of the example causes, wherein the transistor circuit is configured to vary a resistance between the first and second power pins (PIN1, PIN2) between a first value and a second value, wherein that resistance corresponds to the first value when the transistor circuit is deactivated, and wherein the resistance corresponds to the second value when the transistor circuit is activated, wherein the first value is greater than the second value.

Clause S: The system of any of the example causes, wherein each of the first resistor, the second resistor, the first pulldown resistor, and the second pulldown resistor are matched in resistance value.

Clause T: The system of any of the example causes, wherein the control circuit is configured as a state machine that selects the control signals to actuate the switch circuit, the state machine comprising: a first state (IDLE) wherein the first power pin (PIN1) and the second power pin are in an open circuit configuration; a second state (DETECT) wherein second power pin (PIN2) is coupled to the low-side supply (VL), the first power pin (PIN1) is coupled to the high-side supply (VH) via the first pullup resistor, wherein the control circuit monitors a voltage of the first power pin (PIN1); a third state (ATTACHA) wherein second power pin (PIN2) is coupled to the low-side supply (VL), the first power pin (PIN1) is coupled to the high-side supply (VH) via the first pullup resistor, wherein the control circuit monitors a voltage of the first power pin (PIN1); a fourth state (CONNECT B) wherein the first power pin (PIN1) is coupled to the low-side supply (VL) and the second power pin (PIN2) is coupled to the high-side supply (VH), and wherein the control circuit monitors a current consumption of the mobile device; a fifth state (ATTACHB) wherein the first power pin (PIN1) is coupled to the low-side supply (VL), the second power pin (PIN2) is coupled to the high-side supply (VH) via the second pullup resistor, wherein the control circuit monitors a voltage of the second power pin (PIN2); a sixth operating state (CONNECT A) wherein the first power pin (PIN1) is coupled to the high-side supply (VH), the second power pin (PIN2) is coupled to the low-side supply (VL), and wherein the control circuit monitors the current consumption of the mobile device; and a seventh operating state (SHORT) wherein the first power pin (PIN1) and the second power pin (PIN2) are disconnected from power.

Clause U: The system of any of the example causes, wherein the state machine of the control circuit is further configured to: transition from the first state to the second state after a timeout expires; transition from the second state to the first state when the monitored voltage of the first power pin (PIN1) corresponds to the high-side supply voltage (VH); transition from the second state to the third state when the monitored voltage of the first power pin (PIN1) is different from the high-side supply voltage (VH); transition from the third state to the first state when the monitored voltage of the first power pin (PIN1) is the high-side supply voltage (VH); transition from the third state to the fourth state when the monitored voltage of the first power pin (PIN1) is about half of the high-side supply voltage (VH/2); transition from the third state to the fifth state when the monitored voltage of the first power pin (PIN1) is in a range between about half of the high supply voltage (VH/2) and the low-side supply voltage (VL); transition from the fourth state to the first state when the monitored current consumption is below a minimum threshold (IMIN); transition from the fifth state to the first state when the monitored voltage of the second power pin (PIN2) is the low-side supply voltage (VL); transition from the fifth state to the sixth state when the monitored voltage of the second power pin (PIN2) is about half of the high-side supply voltage (VH/2); transition from the fifth state to the seventh state when the monitored voltage of the second power pin (PIN1) is in a range between about half of the high supply voltage (VH/2) and the low-side supply voltage (VL); transition from the sixth state to the first state when the monitored current consumption is below the minimum threshold (IMIN); and transition from the seventh state to the first state after another timeout expires.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A two-wire power delivery system comprising:
   a passive protection circuit in a mobile device with a two-wire power interface that includes two power pins;
   a control circuit, external from the mobile device, wherein the control circuit is powered by a high-side power supply ($V_H$) and a low-side power supply ($V_L$), and wherein the control circuit is configured to detect a voltage at a detect pin and generate one or more control signals; and
   a switch circuit, external from the mobile device, that is configured to selectively control connections between the two power pins (PIN1, PIN2) of the mobile device and one or more of the high-side power supply (VH), the low-side power supply (VL), and the voltage detect pin of the control circuit, such that:
      in an idle state, the switch circuit is configured to decouple the two power pins (PIN2, PIN2) from external power;
      in a test state, one of the two power pins (PIN1, PIN2) of the mobile device is coupled to one of the high-side power supply and the low-side power supply by the switch circuit, and the other of the two power (PIN1, PIN2) is coupled through a series resistor to the other of the high-side power supply and the low-side power supply which corresponds to the detect pin of the control circuit, wherein the control circuit determines an orientation of the two power pins based on a detected voltage at the detect pin; and
      in a connect state, one of the two power pins is coupled to one of the high-side power supply and the low-side power supply by the switch circuit, and the other of the two power pins is coupled to the other of the high-side power supply and the low-side power supply by the switch circuit based on the determined orientation.

2. The system of claim 1, wherein the passive protection circuit comprises:

a first resistor coupled between the two power pins;
a second resistor coupled between one of the two power pins and a battery terminal of the mobile device;
a transistor circuit that is includes a first port coupled to a first one of the two power pins, a second port coupled to the battery terminal of the mobile device, and a third port coupled to the other of the two power pins; and
wherein the transistor circuit is configured to: selectively couple the first port to the second port when the transistor is activated, and wherein the transistor circuit is configured to decouple the first port from the second port when deactivated.

3. The system of claim 2, wherein the transistor circuit comprises one or more of a p-type transistor and an n-type transistor.

4. The system of claim 2, wherein the transistor circuit is configured to vary a resistance between the two terminals between a first value and a second value, wherein that resistance corresponds to the first value when the transistor circuit is deactivated, and wherein the resistance corresponds to the second value when the transistor circuit is activated, wherein the first value is greater than the second value.

5. The system of claim 4, wherein the first resistor and the second resistor are matched such that the first value is approximately twice the value of the second value.

6. The system of claim 1, wherein the series resistor corresponds to one of a pull-up resistor and a pull-down resistor.

7. The system of claim 1, wherein the switch circuit comprises:
a first transistor circuit that includes a first port coupled to the high-side supply ($V_H$), a second port coupled to a first of the two power pins, and a third port coupled to a first of the control signals and configured to selectively couple the high side supply ($V_H$) to the first of the two power pins responsive to the first of the control signals;
a second transistor circuit that includes a first port coupled to the first power pin, a second port coupled to the low-side supply ($V_L$), and a third port coupled to a second of the control signals and configured to selectively couple the low-side supply ($V_L$) to the first of the two power pins responsive to the second of the control signals; and
a third transistor circuit that includes a first port coupled to a first intermediate node, a second port coupled to one of the low-side supply ($V_L$) and the high-side supply ($V_H$), and a third port coupled to a third of the control signals and configured to selectively couple the series resistor to the one of the low-side supply ($V_L$) and the high-side supply ($V_H$) responsive to the third of the control signals.

8. The system of claim 7, wherein the switch circuit comprises:
a fourth transistor circuit that includes a first port coupled to the high-side supply ($V_H$), a second port coupled to a second of the two power pins, and a third port coupled to a fourth of the control signals and configured to selectively couple the high side supply ($V_H$) to the second of the two power pins responsive to the fourth of the control signals
a fifth transistor circuit that includes a first port coupled to the first power pin, a second port coupled to the low-side supply ($V_L$), and a third port coupled to a fifth of the control signals and configured to selectively couple the low-side supply ($V_L$) to the second of the two power pins responsive to the fifth of the control signals; and
a sixth transistor circuit that includes a first port coupled to a second intermediate node, a second port coupled to one of the low-side supply ($V_L$) and the high-side supply ($V_H$), and a third port coupled to a sixth of the control signals and configured to selectively couple another series resistor to the one of the low-side supply ($V_L$) and the high-side supply ($V_H$) responsive to the sixth of the control signals.

9. A two-wire power delivery system comprising:
a passive protection circuit in a mobile device with a two-wire power interface that includes a first power pin and a second power, wherein the passive protection circuit is configured to couple the first power pin to the positive battery terminal (V+) when a voltage applied across the first power pin and the second power has a positive polarity, and configured to decouple the first power pin from the positive battery terminal (V+) when the voltage applied across the first power pin and the second power has a negative polarity;
a control circuit, external from the mobile device, wherein the control circuit is powered by a high-side power supply ($V_H$) and a low-side power supply ($V_L$), and wherein the control circuit is selectively configured to detect a voltage at one of the first power pin and the second power pin, and wherein the control circuit is configured to generate control signals based on an operating phase of the system; and
a switch circuit, external from the mobile device, that is configured by the control signals to:
responsive to a first of the control signals, couple the high-side power supply ($V_H$) to the first power pin;
responsive to a second of the control signals, couple the low-side power supply ($V_L$) to the first power pin;
responsive to a third of the control signals, couple the low-side power supply ($V_L$) to the first power pin via a first pulldown resistor;
responsive to a fourth of the control signals, couple the high-side power supply ($V_H$) to the second power pin;
responsive to a fifth of the control signals, couple the low-side power supply ($V_L$) to the second power pin; and
responsive to a sixth of the control signals, couple the low-side power supply ($V_L$) to the second power pin via a second pulldown resistor.

10. The system of claim 9, wherein the passive protection circuit comprises:
a first resistor coupled between the first power pin and the second power pin;
a second resistor coupled between the positive battery terminal (V+) of the mobile device and the second power pin;
a transistor circuit that includes a first port coupled to a the first power pin, a second port coupled to the positive battery terminal (V+) of the mobile device, and a third port coupled to the second power pin; and
wherein the transistor circuit is configured to: selectively couple the first port to the second port when the transistor is activated, and wherein the transistor circuit is configured to decouple the first port from the second port when deactivated.

11. The system of claim 10, wherein the transistor circuit is configured to vary a resistance between the first and second power pins (PIN1, PIN2) between a first value and a second value, wherein that resistance corresponds to the first value when the transistor circuit is deactivated, and wherein the resistance corresponds to the second value when the transistor circuit is activated, wherein the first value is greater than the second value.

12. The system of claim 10, wherein each of the first resistor, the second resistor, the first pulldown resistor, and the second pulldown resistor are matched in resistance value.

13. The system of claim 9, wherein the control circuit is configured as a state machine that selects the control signals to actuate the switch circuit, the state machine comprising:
a first state wherein the first power pin and the second power pin are in an open circuit configuration;
a second state (DETECT) wherein first power pin is coupled to the high-side supply ($V_H$), the second power pin is coupled to the low-side supply ($V_L$) via the second pulldown resistor, wherein the control circuit monitors a voltage of the second power pin;
a third state (ATTACHA) wherein the first power pin is coupled to the high-side supply ($V_H$), the second power pin is coupled to the low-side supply ($V_L$) via the second pulldown resistor, wherein the control circuit monitors the voltage of the second power pin;
a fourth state (CONNECT B) wherein the first power pin is coupled to the low-side supply ($V_L$) and the second power pin is coupled to the high-side supply ($V_H$), and wherein the control circuit monitors a current consumption of the mobile device;
a fifth state (ATTACHB) wherein second power pin is coupled to the low-side supply ($V_L$), the first power pin is coupled to the high-side supply ($V_H$) via the first pulldown resistor, and wherein the control circuit monitors a voltage of the first power pin;
a sixth operating state (CONNECT A) wherein the first power pin is coupled to the high-side supply ($V_H$), the second power pin is coupled to the low-side supply ($V_L$), and wherein the control circuit monitors the current consumption of the mobile device; and
a seventh operating state (SHORT) wherein the first power pin and the second power pin are disconnected from power.

14. The system of claim 13, wherein the state machine of the control circuit is further configured to:
transition from the first state to the second state after a timeout expires;
transition from the second state to the first state when the monitored voltage of the second power pin corresponds to the low-side supply voltage ($V_L$);
transition from the second state to the third state when the monitored voltage of the second power pin is different from the low-side supply voltage ($V_L$);
transition from the third state to the first state when the monitored voltage of the second power pin is the high-side supply voltage ($V_H$);
transition from the third state to the fourth state when the monitored voltage of the second power pin is about half of the high-side supply voltage;
transition from the third state to the fifth state when the monitored voltage of the second power pin is in a range between about half of the high supply voltage and the high-side supply voltage ($V_H$);
transition from the fourth state to the first state when the monitored current consumption is below a minimum threshold;
transition from the fifth state to the first state when the monitored voltage of the first power pin is the low-side supply voltage ($V_L$);
transition from the fifth state to the sixth state when the monitored voltage of the first power pin is about half of the high-side supply voltage;
transition from the fifth state to the seventh state when the monitored voltage of the first power pin is in a range between about half of the high supply voltage and the high-side supply voltage ($V_H$);
transition from the sixth state to the first state when the monitored current consumption is below the minimum threshold; and
transition from the seventh state to the first state after another timeout expires.

15. A two-wire power delivery system comprising:
a passive protection circuit in a mobile device with a two-wire power interface that includes a first power pin and a second power, wherein the passive protection circuit is configured to couple the second power pin to the negative battery terminal (V−) when a voltage applied across the first power pin and the second power has a positive polarity, and configured to decouple the second power pin from the negative battery terminal (V−) when the voltage applied across the first power pin and the second power has a negative polarity;
a control circuit, external from the mobile device, wherein the control circuit is powered by a high-side power supply ($V_H$) and a low-side power supply ($V_L$), and wherein the control circuit is selectively configured to detect a voltage at one of the first power pin and the second power pin, and wherein the control circuit is configured to generate control signals based on an operating phase of the system; and
a switch circuit, external from the mobile device, that is configured by the control signals to:
responsive to a first of the control signals, couple the high-side power supply ($V_H$) to the first power pin;
responsive to a second of the control signals, couple the low-side power supply ($V_L$) to the first power pin;
responsive to a third of the control signals, couple the high-side power supply ($V_H$) to the first power pin via a first pullup resistor;
responsive to a fourth of the control signals, couple the high-side power supply ($V_H$) to the second power pin;
responsive to a fifth of the control signals, couple the low-side power supply ($V_L$) to the second power pin; and
responsive to a sixth of the control signals, couple the high-side power supply ($V_H$) to the second power pin via a second pullup resistor.

16. The system of claim 15, wherein the passive protection circuit comprises:
a first resistor coupled between the first power pin and the second power pin;
a second resistor coupled between the negative battery terminal (V−) of the mobile device and the first power pin;
a transistor circuit that includes a first port coupled to a the second power pin, a second port coupled to the negative battery terminal (V−) of the mobile device, and a third port coupled to the first power pin; and
wherein the transistor circuit is configured to: selectively couple the first port to the second port when the transistor is activated, and wherein the transistor circuit is configured to decouple the first port from the second port when deactivated.

17. The system of claim 16, wherein the transistor circuit is configured to vary a resistance between the first and second power pins (PIN1, PIN2) between a first value and a second value, wherein that resistance corresponds to the first value when the transistor circuit is deactivated, and wherein the resistance corresponds to the second value when the transistor circuit is activated, wherein the first value is greater than the second value.

18. The system of claim 16, wherein each of the first resistor, the second resistor, the first pulldown resistor, and the second pulldown resistor are matched in resistance value.

19. The system of claim 15, wherein the control circuit is configured as a state machine that selects the control signals to actuate the switch circuit, the state machine comprising:
  a first state wherein the first power pin and the second power pin are in an open circuit configuration;
  a second state (DETECT) wherein second power pin is coupled to the low-side supply ($V_L$), the first power pin is coupled to the high-side supply ($V_H$) via the first pullup resistor, wherein the control circuit monitors a voltage of the first power pin;
  a third state (ATTACHA) wherein second power pin is coupled to the low-side supply ($V_L$), the first power pin is coupled to the high-side supply ($V_H$) via the first pullup resistor, wherein the control circuit monitors a voltage of the first power pin;
  a fourth state (CONNECT B) wherein the first power pin is coupled to the low-side supply ($V_L$) and the second power pin is coupled to the high-side supply ($V_H$), and wherein the control circuit monitors a current consumption of the mobile device;
  a fifth state (ATTACHB) wherein the first power pin is coupled to the low-side supply ($V_L$), the second power pin is coupled to the high-side supply ($V_H$) via the second pullup resistor, wherein the control circuit monitors a voltage of the second power pin;
  a sixth operating state (CONNECT A) wherein the first power pin is coupled to the high-side supply ($V_H$), the second power pin is coupled to the low-side supply ($V_L$), and wherein the control circuit monitors the current consumption of the mobile device; and
  a seventh operating state (SHORT) wherein the first power pin and the second power pin are disconnected from power.

20. The system of claim 19, wherein the state machine of the control circuit is further configured to:
  transition from the first state to the second state after a timeout expires;
  transition from the second state to the first state when the monitored voltage of the first power pin corresponds to the high-side supply voltage ($V_H$);
  transition from the second state to the third state when the monitored voltage of the first power pin is different from the high-side supply voltage ($V_H$);
  transition from the third state to the first state when the monitored voltage of the first power pin is the high-side supply voltage ($V_H$);
  transition from the third state to the fourth state when the monitored voltage of the first power pin is about half of the high-side supply voltage;
  transition from the third state to the fifth state when the monitored voltage of the first power pin is in a range between about half of the high supply voltage and the low-side supply voltage ($V_L$);
  transition from the fourth state to the first state when the monitored current consumption is below a minimum threshold;
  transition from the fifth state to the first state when the monitored voltage of the second power pin is the low-side supply voltage ($V_L$);
  transition from the fifth state to the sixth state when the monitored voltage of the second power pin is about half of the high-side supply voltage;
  transition from the fifth state to the seventh state when the monitored voltage of the second power pin is in a range between about half of the high supply voltage and the low-side supply voltage ($V_L$);
  transition from the sixth state to the first state when the monitored current consumption is below the minimum threshold; and
  transition from the seventh state to the first state after another timeout expires.

* * * * *